(12) United States Patent
Agrawala et al.

(10) Patent No.: US 6,424,933 B1
(45) Date of Patent: Jul. 23, 2002

(54) SYSTEM AND METHOD FOR NON-UNIFORM SCALED MAPPING

(75) Inventors: Maneesh Agrawala, San Francisco; Chris Stolte, Stanford, both of CA (US)

(73) Assignee: Vicinity Corporation, Sunnyvale, CA (US)

( * ) Notice: Subject to any disclaimer, the term of this patent is extended or adjusted under 35 U.S.C. 154(b) by 0 days.

(21) Appl. No.: 09/528,703

(22) Filed: Mar. 17, 2000

(51) Int. Cl.⁷ ............................ G06F 7/60; G06F 17/10; G06F 101/00
(52) U.S. Cl. ........................... 703/2; 701/201; 701/212; 707/104.1
(58) Field of Search ................................ 703/1, 2, 3, 6; 701/201–212; 707/104

(56) References Cited

U.S. PATENT DOCUMENTS

| | | | | |
|---|---|---|---|---|
| 5,848,374 A | * | 12/1998 | Wakabayashi et al. | 701/212 |
| 5,948,040 A | * | 9/1999 | DeLorme et al. | 701/201 |
| 6,067,502 A | | 5/2000 | Hayashida et al. | 701/209 |
| 6,125,367 A | * | 9/2000 | Na | 707/104 |
| 6,202,026 B1 | | 3/2001 | Nimura et al. | 701/211 |

FOREIGN PATENT DOCUMENTS

WO    PCT/US01/08440    8/2001

OTHER PUBLICATIONS

Sarkar et al, "Graphical Fisheye Views", Communications of the ACM, vol. 37 Issue 12, pp. 73–83 (1994).*
Mehta et al, "The Road Best Traveled", Geo Info Systems, vol. 9 Issue 3, pp. 36–39 (Mar. 1999).*
Rayson, "Aggregate Towers: Scale Sensitive Visualization and Decluttering of Geospatial Data", IEEE 1999 Symposium on Information Visualization, pp. 92–99, 149 (1999).*
Carpendale et al., 1995, "Three–Dimensional Pliable Surfaces: For the Effective Presentation of Visual Information," Proceedings of the ACM Symposium on User Interface Software and Technology, UIST 95:217–226.
Cormen et al., *Introduction to Algorithms*, Chapter 17, pp. 329–355.
Edmondson et al., 1997, "A General Cartographic Labeling Algorithm," *Cartographica* 33:12–23.
Kirkpatrick et al., 1983, "Optimization by Simulated Annealing," *Science* 220(4598):671–680.
Markosian et al., "Real–Time Nonphotorealistic Rendering," In: Siggraph 97 Conference Proceedings (Aug. 1997), pp. 415–420.
Seligmann and Feiner, 1991, "Automated Generation of Intent–Based 3D Illustrations," *Computer Graphics* 25(4):123–132.
Rogers et al., "An Adaptive Interactive Agent for Route Advice," DaimlerChrysler Research and Technology Center, May 1–5, 1999, pp. 198–205.
Haigh et al., "Route Planning by Analogy," Proc. Of Intl. Conf. On Case–Based Reasoning, 1995, pp. 1–12.

* cited by examiner

*Primary Examiner*—Kevin J. Teska
*Assistant Examiner*—Samuel Broda
(74) *Attorney, Agent, or Firm*—Pennie & Edmonds LLP

(57) ABSTRACT

A system and method for making computer-generated maps includes a different scale factor for each road in a route. The scale factors are used to optimize the route map against an objective function that considers factors such as the number of false intersections in the route and the number of roads falling below a minimum length threshold. The position of each label corresponding to a road in the map is selected from a continuous range of possible positions by refinement against a target function that minimizes the number of roads, labels and annotations the label intersects as well as the distance between the label and the center of the road corresponding to the label. A refinement technique such as simulated annealing is used to find a solution to the target function. Each road in the scaled map is rendered to provide a finished product having the appearance of a hand-drawn map.

38 Claims, 10 Drawing Sheets

(Prior Art - With Arrows Added)

(a)

(b)

SYSTEM AND METHOD FOR NON-UNIFORM SCALED MAPPING

The present invention relates generally to a system and method for generating a route map. More particularly, this invention relates to a system and method for applying a unique scale factor to each road in a route map and for optimizing the positions of labels in the route map. Further, a method for rendering the appearance of roads in the route map is disclosed.

BACKGROUND

Route maps, when well designed, are an effective device for visualizing and communicating directions. Such maps have existed in various forms for centuries, and the recent availability of detailed geographic databases via the Internet has led to the widespread use of computer-generated route maps. Online mapping services typically provide directions as a set of maps complemented with text descriptions. Such on-line computer-generated maps are unsatisfactory, however, because the algorithms used to generate the maps disregard many of the techniques and principles used by human map-makers.

Effective use of a route map generally requires two distinct activities: (i) following a path until reaching a critical point and (ii) changing orientation to follow another path. Thus, one of the most important types of information route maps can communicate are points of reorientation. That is, where someone must consciously turn from one path to another. However, existing computer-generated route maps fail to effectively communicate points of reorientation because they typically uniformly scale all the roads in the map by a constant scale factor. As an example, for routes of any reasonable length, uniform scaling requires some roads to be very short so that the map will fit in a particular viewport. But it is precisely these very short roads that connect critical turning points. Thus, uniform scaling results in a loss of some of the most critical information found in a route map.

Another shortcoming in prior art computer-generated route maps is that they needlessly depict accurate length, angle, and curvature of each road in the route. Such accurate depictions are made at the expense of map readability. Psychological research indicates that most people distort distances, angles, and curvature when drawing route maps. See e.g., Tversky and Lee, "How space structures language," Spatial Cognition: An interdisciplinary approach to representation and processing of spatial knowledge, (eds.) Freska, Habel, and Wender, 1998, 157–175; Tversky and Lee, "Pictorial and Verbal Tools for Conveying Routes," COSIT 99, Conference Proceedings, Stade Germany, 1999, 51–64. Other psychological studies indicate that people maintain such distortions in their own mental representations of a route. See e.g., Tversky, "Distortions in Cognitive Maps," Geoforum 23, 1992, 131–138. Thus, adherence to accurate lengths and angles in prior art computer-generated maps runs counter to how humans conceptualize routes.

Computer-generated route maps can be classified into four major mapping styles: route highlight maps, TripTiks, overview/detail maps, and two dimensional nonlinear distortion maps. Route highlight maps simply highlight the route on a general road map of the region, as shown in FIG. 1. Since the purpose of general road maps is to provide an understanding of the entire road system in a region, such maps typically employ constant scale factors and display extraneous detail throughout the map. The constant scaling, as exhibited in FIG. 1, generally causes one of two problems. Either detailed turn information is lost because the scale factor is too large, or the scale factor is small enough to show the detail, but the map is very large. Since general road maps are not optimized to show any particular route, a route highlight map will often suffer from both a large scale factor and an inconvenient size. The clarity of the route in a route highlight map depends on the style of the highlighting since that is the only property differentiating the route from other roads. Usually the route is distinctively colored, but because general road maps provide context information over the entire map, the map is cluttered with extraneous information that makes it difficult to perceive the route and the individual reorientation points.

TripTiks are similar to route highlight maps, but they are specifically designed for communicating a particular route. As shown in FIG. 2, a TripTik map usually stretches over multiple rectangular pages, and each page is oriented so that the route runs roughly down the center of the page. Each TripTik page employs constant scaling, but the scale factor differs across pages. Changing the scale factor from page to page allows the TripTik to show more detailed turn information where needed. However, because the map stretches over many pages and the orientation and scale factor varies from page to page, forming a general understanding of the overall route is difficult.

Overview/detail maps combine multiple maps rendered at different scales to present a single route, as shown in FIG. 3. One of the maps (e.g., FIG. 3a) is scaled by a large factor so that it provides an overview of the entire route. Since the large scale factor of this map reduces the readability of local turn details, maps showing turn-by-turn information are provided (e.g., FIG. 3b). A constant scale factor is used for each map, but the scale factor differs across the maps. While an overview/detail map may seem like an effective combination, such maps are unsatisfactory in practice. The overview map rarely presents more than the overall direction of the route. Although turn-by-turn maps provide detailed information for every turn, the use of distinct maps for each turn, often with different orientation and scale, makes it difficult to understand how the maps correspond to one another. Therefore, the navigator has difficulty forming a cognitive model of the route.

To ensure clear communication of all of the reorientation points, some parts of a route's depiction may require a small scale factor while others require a large scale factor. Researchers have described attempts to use two dimensional nonlinear image distortion techniques on general road maps to provide focus-plus-context viewing. (See. e.g., Carpendale et al., "Three-Dimensional Pliable Surfaces: For the Effective Presentation of Visual Information," Proceedings of the ACM Symposium on User Interface Software and Technology, UIST 95, 1995, 217–226; Keahey, "The Generalized Detail-In-Context Problem," Proceedings of the IEEE Symposium on Information Visualization, IEEE Visualization 1998). These techniques allow users to choose regions of the map they want to focus on and then apply a nonlinear magnification, such as a spherical distortion, to enlarge these focus regions. Such two dimensional distortion allows detailed information to be displayed only where relevant and often produces general area maps that can be conveniently displayed on a single page. However, a major problem with nonlinear two-dimensional distortion is that the regions at the edges between the magnified and non-magnified portions of the map undergo extreme distortion.

In an effective route map, all essential components of the route, especially the roads, are easily identifiable. The route is clearly marked and readily apparent even at a quick glance. The map contains only as much information as is necessary and is easy to carry and manipulate. To further such design goals, map content, precision, and rendering style must be carefully optimized. Map content includes important parameters such as a route start and end, as well as points of reorientation. Reorientation points are points along the route at which the navigator must change orientation and switch to a different road. Another important map design goal is the proper use of context information. The amount of context information included in the map greatly affects the utility of the map. Useful context information includes labels or names for a path on the route as well as landmarks along the route such as buildings, stop lights, or stop signs. When drawing a route map by hand, people most commonly use landmarks to indicate points of reorientation and, less frequently, to communicate progress along a road.

Environmental psychology studies have demonstrated that human generated route maps contain distortion. There are three primary types of distortion: (1) inaccurate path lengths, (2) incorrect turning angles at intersections, and (3) simplified road shape. For example, Tversky and Lee, COSIT 99 Conference Proceedings, 1999, 51–64, asked a group of students to sketch a route map between two locations near the Stanford University campus. Although they encouraged participants in their study to represent paths and intersections accurately, most did not. Most intersections were drawn at right angles regardless of their actual angle and seventy-one percent of the participants used simple generic curves and straight lines to represent roads. Even when participants intended to communicate the shape or length of the road accurately, they typically rendered these attributes incorrectly. Such distortion in the map is in fact beneficial because it increases the flexibility available to the map-maker in the design and layout of the map. Variably scaling the length of each road allows the map-maker to ensure all reorientation points are visible, while flexibility in choosing turning angles and road curvature allows the map to be simplified. Such distortions can simultaneously improve the readability and convenience of the route map with little adverse effect on its clarity and completeness.

Although all maps are abstract representations of a route, there is a range of styles that can be used to render a map, with varying associations of accuracy and realism. An appropriate rendering style can greatly affect the readability and clarity of a map. Retinal properties such as color and line thickness are used to draw attention to important features of the map. Rendering style can also aid the user in interpreting how closely the map corresponds with the real world.

Hand-drawn route maps often present a good combination of readability, clarity, completeness and convenience, as shown in FIG. 4. Instead of using a constant scale factor, hand-drawn maps only maintain the relative ordering of roads by length. While this ensures that longer roads appear longer than shorter roads in the map, each road is scaled by a different factor. Often the map designer does not know the exact length of the roads and only knows their lengths relative to one another. The flexibility of relative scaling allows hand-drawn route maps to fit within a manageable size and remain readable.

Hand-drawn route maps typically remove most contextual information that does not lie directly along the route. This strategy reduces overall clutter and improves clarity. The intersection angles in hand-drawn maps are generally incorrect, the precise shape of roads is often misrepresented, and the roads are typically depicted as generically straight or curved. These distortions make the map simpler and only remove unnecessary information.

Hand-drawn route maps are rendered in a "sketchy" style typical of quick pen-and-ink doodling. Many navigators are familiar with such hand-drawn maps and the sketchy style is a subtle indicator of imprecision in the map.

Based on the above background it is apparent that what is needed in the art is an improved system and method for making computer-generated maps. What is further needed in the art is a system and method for making computer generated maps that avoid the pitfalls found in existing mapmaking algorithms, such as the use of extraneous information and constant scaling.

SUMMARY OF THE INVENTION

The present invention provides an improved system and method for making computer-generated maps. In the present invention, each road in a route is individually scaled. The scale factor for each road is optimized using an objective function that considers a number of factors such as the number of false intersections and the number of roads that are shorter than a minimum threshold length. Thus, the scaled route fits in a predetermined viewport without loss of information about important turns. Refinement against the objective function is performed by one of many possible search algorithms such as greedy searches, simulated annealing schedules, or gradient descents. Greedy search algorithms are described in Cormen et al., Introduction to Algorithms, eds. Cormen, Leiserson, & Rivest, MIT Press & McGraw-Hill, Location of publisher, 1990, 329–355. Simulated annealing was first disclosed by Kirkpatrick et al. in the article "Optimization by Simulated Annealing," Science 220, 1983, 671–680.

Map clutter in the scaled map is avoided by refining label positions against a novel target function that minimizes the number of roads the labels intersect, the number of labels that intersect each other, and the distance between a label and the center of a road corresponding to the label. In one embodiment, simulated annealing is used to find a solution to the novel target function. The final scaled route map is rendered so that it has the appearance of a hand-drawn map. The rendered map clearly communicates every reorientation point in a readable and convenient form.

One embodiment of the present invention provides a method for preparing a route map that describes a path between a start and an end. The method comprises obtaining the path from the start to the end. In this embodiment, the path includes an initial set of elements. Each element in the set has enough information to determine a direction. Further, each element in the set intersects at least one other element in the set. A different individual scale factor is applied to each of at least two elements in the set to produce a scaled set of elements. Then, labels that correspond to elements in the scaled set are assigned label positions that are proximal to their corresponding elements. The position of the labels are refined against a target function and the resulting route map and refined labels are outputted to a viewport.

In one embodiment, the different individual scale factors that are applied to one or more elements is subject to the constraint that the relative ranking, based on length, of each element in the scaled set of elements is the same as the relative length of the corresponding element in the initial set of elements. In another embodiment, each element in the initial set of elements is assigned to a particular bin based on element length. Each bin represents a range of element lengths that does not overlap with a range of element lengths represented by other bins. A different bin scale factor is assigned to each bin and the bin scale factor is applied to each element in a bin.

In yet another embodiment, the route map includes a bounding edge and each scale factor that is applied to individual elements is derived by a series of steps. First, a single scale factor is applied to each element in the initial set of elements to form the scaled set of elements. This single scale factor is determined by a factor necessary to adjust the length of the shortest element in the initial set of elements so that it has a minimum acceptable length. Second, the path is traversed, beginning at the path origin, until an element that exceeds the bounding edge is identified. When such an offending element is identified, each element that has been traversed before reaching the offending element, which is longer than a minimum length and that has a direction that is within ninety degrees of the direction of the offending element, is noted. The noted elements are sorted by length, with the longest element first, to form a sorted list. Third, elements are sequentially selected from the sorted list of elements. When an element is selected, the scale factor associated with the selected element is adjusted so that the length of the selected element is minimized. In one embodiment, the scale factor is minimized using a greedy algorithm. Minimization of the scale factor is subjected to the constraint that the relative length of the element after application of the new scale factor is the same as the corresponding element in the initial set of elements. After the length of a selected element has been minimized, a check is performed to determine whether the offending element continues to exceed the bounding edge. When the offending element no longer exceeds the bounding edge, the process continues by again attempting to traverse the route, beginning at the path origin, until a new offending element is discovered. The traversal of the path is repeated until the complete path is traversed without the identification of an element that exceeds the bounding edge.

In another embodiment of the present invention, individual scale factors are derived using a simulated annealing schedule. First, a scale factor is applied to each element in the initial set of elements to form a scaled set of elements. The single scale factor is determined by a factor necessary to adjust the length of the shortest element in the initial set of elements so that it has a length that matches or exceeds a minimum length threshold. Then an initial temperature t is set and a first score ($E_1$) is measured using an objective function that determines the quality of the scaled set of elements. In the next step, an arbitrary scale factor is applied to a randomly selected element in the scaled set of elements and a second score ($E_2$) is measured using the same objective function. The arbitrary scale factor is automatically accepted when $E_2$ is less than $E_1$. The arbitrary scale is generally rejected when $E_2$ is greater than $E_1$. However, there is a small probability $P(\Delta E)$ that the score is accepted when $E_2$ is greater than $E_1$. In one embodiment, this probability is:

$$P(\Delta E)=\exp^{-[(\Delta E)/(k*t)]}$$

where, $\Delta E=(E_1)-(E_2)$ and
k is a constant.

In alternative embodiments, other probability functions are used. Generally, any probability function that is dependent on temperature is suitable. Such probability functions include, for example, probability functions that are exponentially, linearly, and/or logarithmically dependent upon temperature t.

The process of assigning an arbitrary scale factor to a randomly selected element and then determining whether to accept the arbitrary scale factor is repeated a number of times before the temperature is decremented. When the temperature is decremented, the process of assigning an arbitrary scale factor to an element and determining whether to accept the scale factor again repeats for a number of times before the temperature is decremented. Temperature is repeatedly decremented in this manner until the first occurrence of an exit condition.

In one embodiment, the objective function that is used to obtain scores $E_1$ and $E_2$ is a summation of:
(i) a first weight multiplied by a number of false intersections existing between elements in the scaled set of elements;
(ii) a second weight multiplied by the number of elements in the scaled set of elements that do not have the same relative ordering by length as the corresponding element in the initial set of elements;
(iii) a third weight multiplied by a number of elements in the scaled set of elements having a length that is shorter than a minimum length threshold; and
(iv) a fourth weight multiplied by the number of elements in the scaled set of elements having a vector varying by more than a predetermined number of degrees from the vector of a corresponding element in the initial set of elements.

In still another embodiment of the present invention, the route map includes a set of labels. Each label in the set corresponds to a different element in the scaled set of elements. The positions of the labels in the set are refined using a simulated annealing schedule. Accordingly, an initial temperature t is set and then a label is randomly selected from the set of labels. A bounding box is defined for the selected label. The bounding box includes the center of the element corresponding to the selected label. The selected label is positioned at the center of the bounding box and a first score ($S_1$) is determined using a novel target function. Then, the position of the label is adjusted by an amount before recalculating a second score ($S_2$) using the target function and the new position of the label. The new position for the selected label is unconditionally accepted when $S_2$ is less than $S_1$. Further, there is a small probability $P(\Delta S)$ that the score is accepted when $S_2$ is less than $S_1$. In one embodiment, the probability $P(\Delta S)$ is defined as:

$$P(\Delta S)=\exp^{-[(\Delta S)/(k*t)]}$$

where $\Delta S=(S_1)-(S_2)$ and
k is a constant.

In alternative embodiments, other probability functions are used. Generally, any probability function that is dependent on temperature is suitable. Such probability functions include, for example, probability functions that are exponentially, linearly, and/or logarithmically dependent upon temperature.

The process of repositioning a randomly selected label and then determining whether to accept the new position for the selected label repeats a number of times before the temperature t is decremented. When the temperature is decremented, the process of repositioning a randomly selected label and determining whether to accept the new position repeats for a number of times before the temperature is again decremented. The temperature is repeatedly decremented in this manner until the first occurrence of an exit condition.

In one embodiment, the target function is determined by at least one of:
(i) a first weight multiplied by the number of elements that overlap with the selected label;

(ii) a second weight multiplied by the number of labels in the set of labels that the selected label overlaps;

(iii) a third weight multiplied by the number of annotations the selected label overlaps;

(iv) a fourth weight multiplied by a first heavy function; the first heavy function having a value of:

"1" when said label exceeds a dimension of the desired viewport, and a value of

"0" when the label does not exceed a dimension of the desired viewport;

(v) a fifth weight multiplied by a normalized distance between the selected label and the center of the element corresponding to the label; and (vi) a sixth weight multiplied by a second heavy function where the second heavy function has the value:

"1" when the label is below the element corresponding to the label, and a value of "0" when the label is above the corresponding element.

Another embodiment of the present invention provides a computer program product for use in conjunction with a computer system to prepare a route map having a path with a start to an end. The computer program product comprises a computer readable storage medium and a computer program mechanism embedded therein. The computer program mechanism comprises a direction parser module that includes instructions for obtaining the path. The path comprises an initial set of elements such as roads. Each element in the initial set of elements includes sufficient information to determine a direction. The computer program mechanism further comprises a road layout module that includes instructions for applying a different scale factor to at least two elements in the initial set of elements. Application of the different scale factor to each of at least two elements in the initial set of elements produces a scaled set of elements. The computer program mechanism further comprises a label layout module that includes instructions for assigning a label, which corresponds to an element in the scaled set of elements, to a label position that is proximal to the corresponding element. The label layout module also has instructions for determining a refined label position by refining an initial label position against a novel target function. Finally, the computer program mechanism comprises a map renderer module that includes instructions for outputting the label at the refined label position and instructions for rendering each element in the scaled set of elements.

BRIEF DESCRIPTION OF THE DRAWINGS

Like reference numerals refer to corresponding parts throughout the several views of the drawings.

DETAILED DESCRIPTION OF THE INVENTION

The present invention provides a system and method for generating maps that has the benefits and characteristics of a hand-drawn map. Automatically generating route maps in this style is complex. Distorting aspects of the map can accentuate reorientation points, but it can also have detrimental effects such as introducing false intersections. Creating an effective route map generally requires searching a large space of possible map layouts for an optimal layout. An efficient multistage algorithm that couples a road layout refinement module with a label and annotation placement module is disclosed. The resulting map is rendered using subtle perceptual cues, such as a wavy hand-drawn style for drawing the paths, to communicate the distortion of scale and shape.

The design goals of the present invention are:

(i) Roads should be variably scaled so that all roads and reorientation points are clearly visible and easily labeled.

(ii) If road A is longer than road B, then road A should be noticeably longer than road B in the map.

(iii) The representation of a road only needs to convey general curvature and the significant changes in orientation.

(iv) The precise angle of intersection is not important; instead it is sufficient to communicate clearly the action to be taken (turn left; turn right) and a generalized orientation.

(v) The start and end of the route should be clearly marked.

(vi) A "sketchy" style should be used to render a road in order to represent an imprecision of scale and orientation.

(vii) The resulting map should fit in the desired viewport, such as a single sheet of paper, a computer display screen and/or a window in a graphical user interface.

Figure 1:
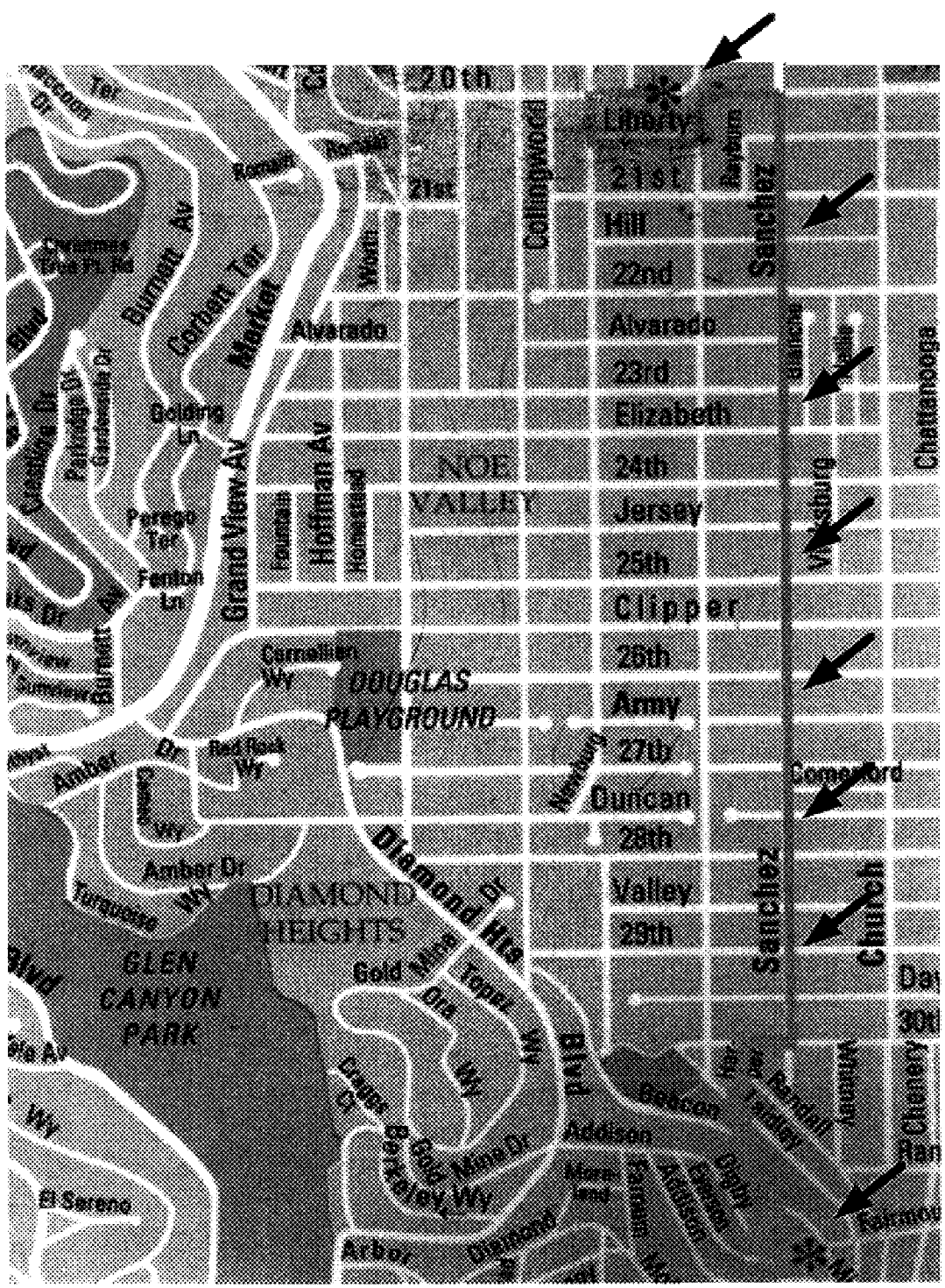
FIG. 1 is a prior art route highlight map.
Figure 2:
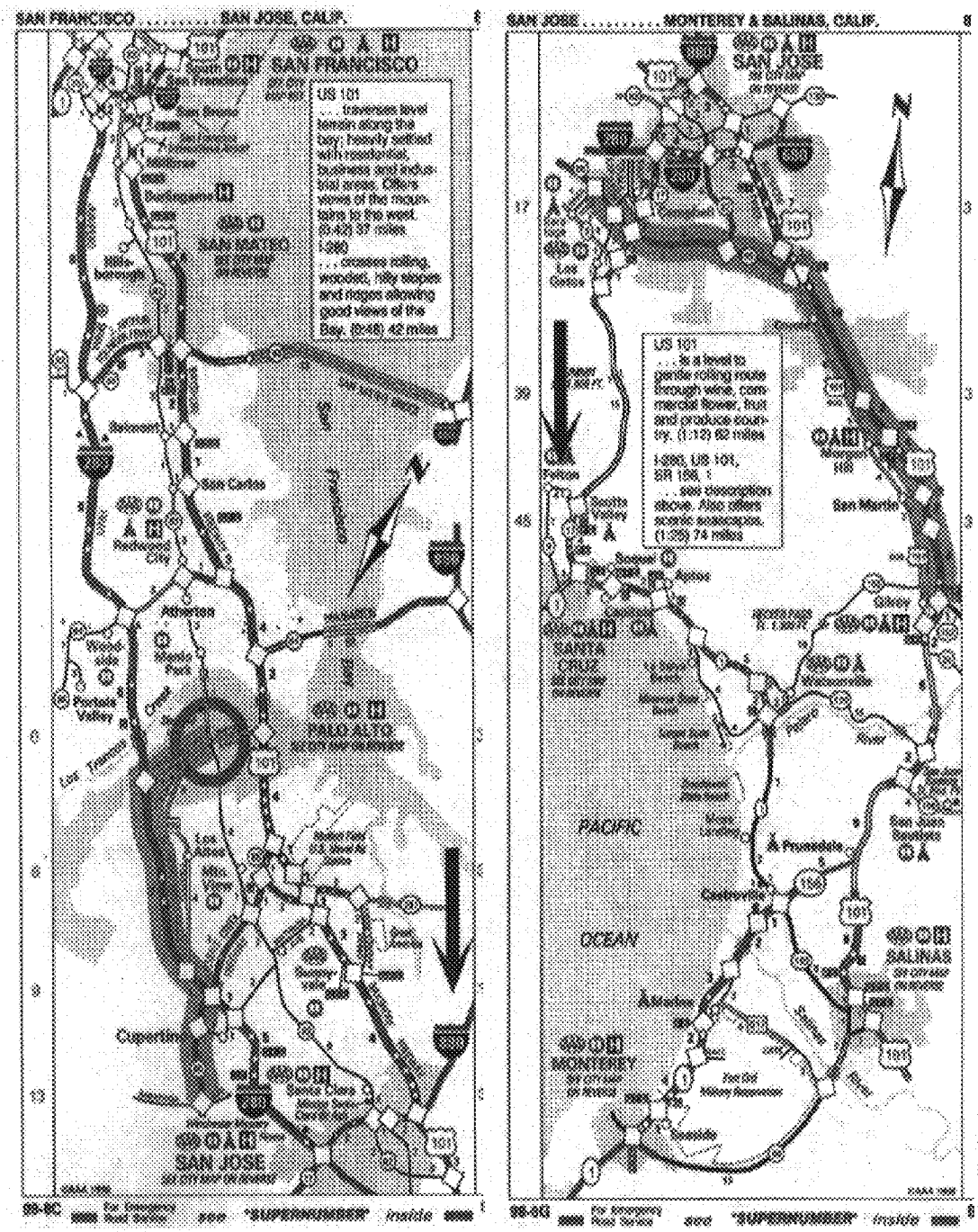
FIG. 2 is a prior art TripTik map.
Figure 3:
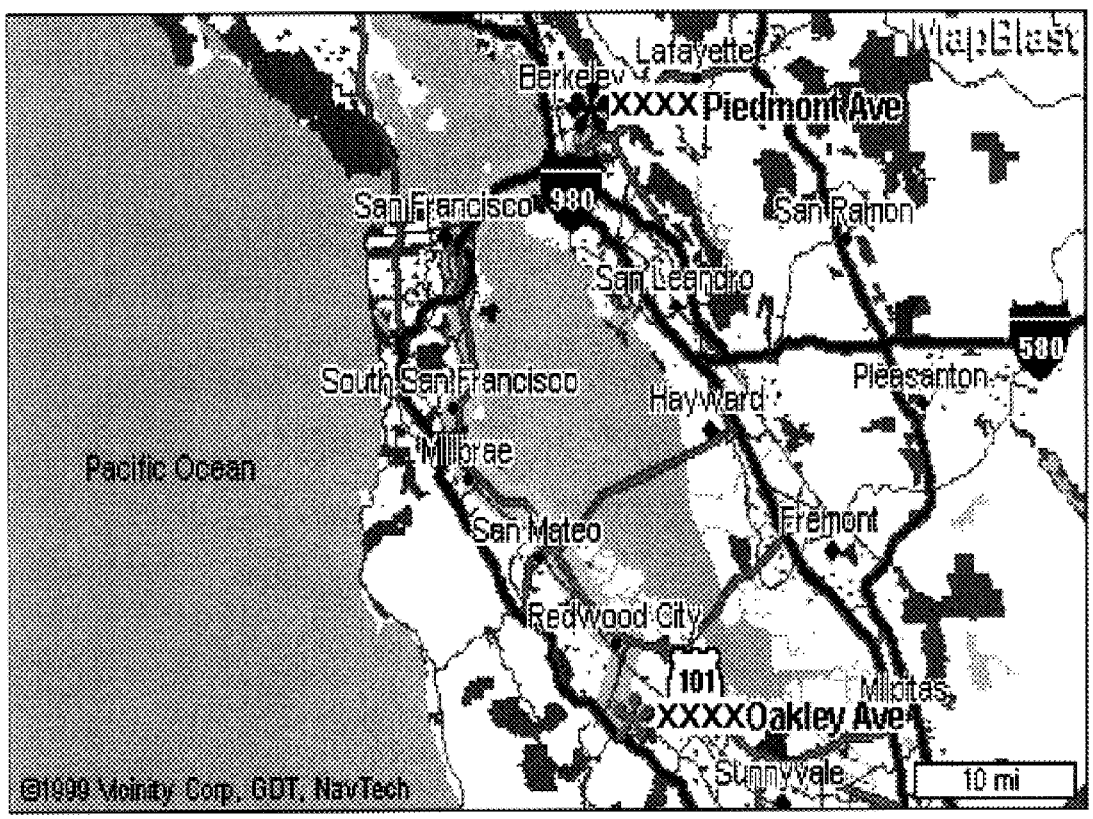
FIGS. 3(a) and 3(b) are a prior art Overview/Detail maps.
Figure 3:
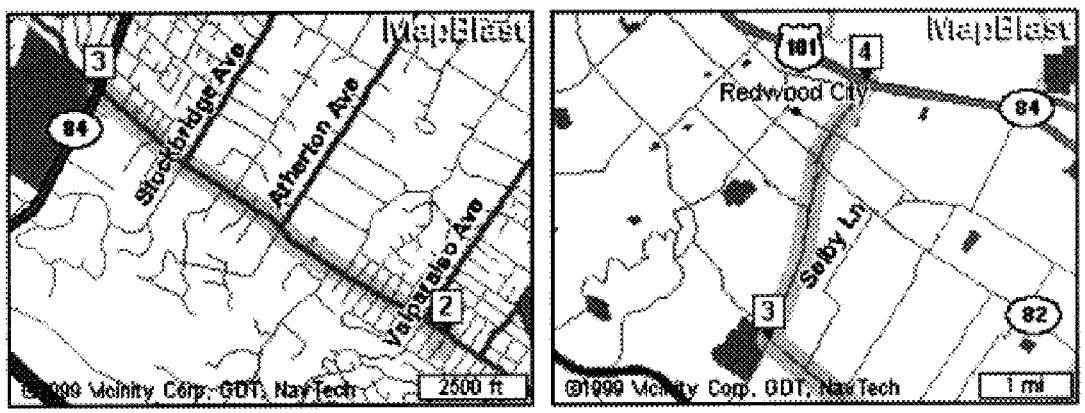
Figure 4:
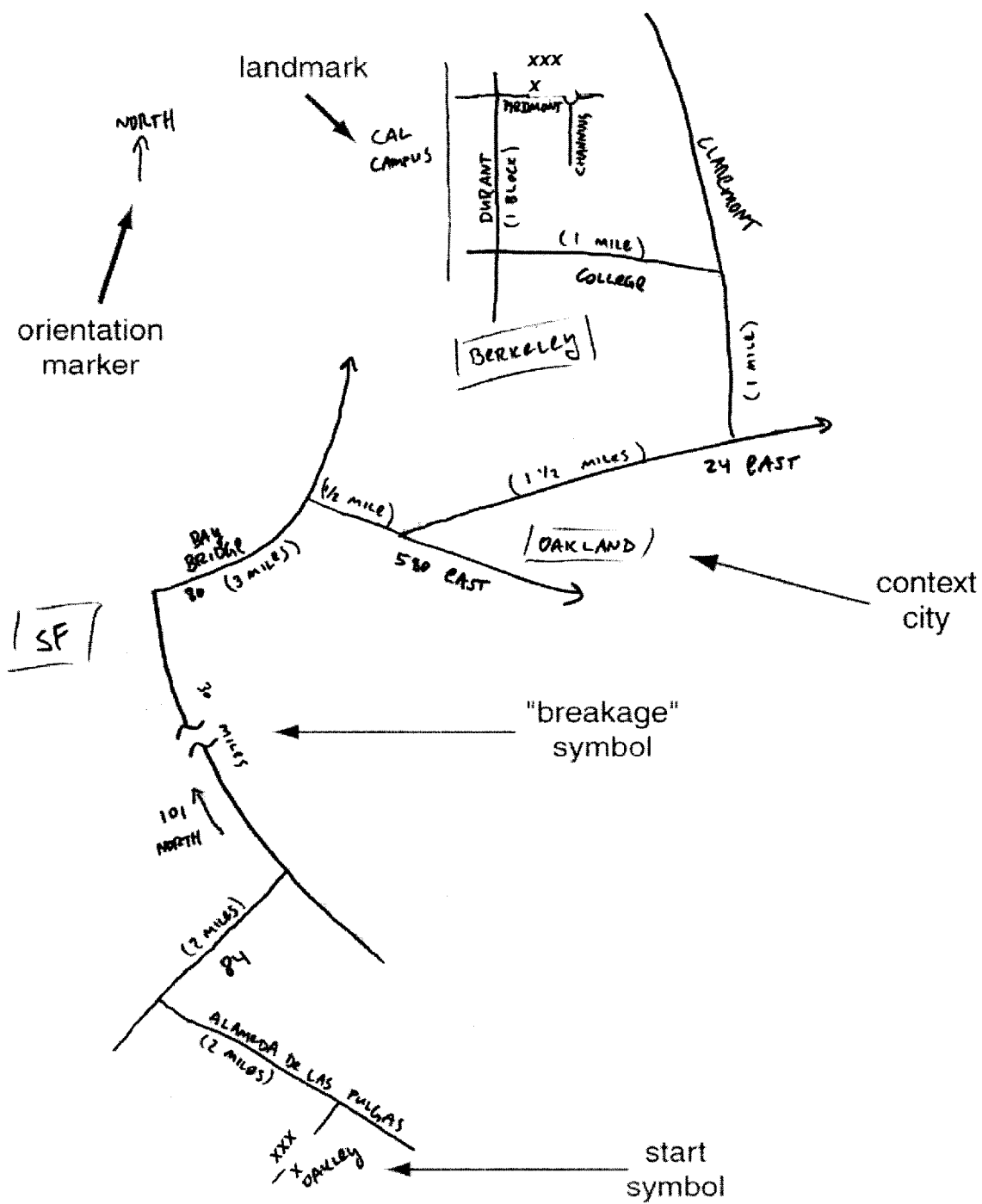
FIG. 4 is a prior art hand-drawn map.
Figure 5:
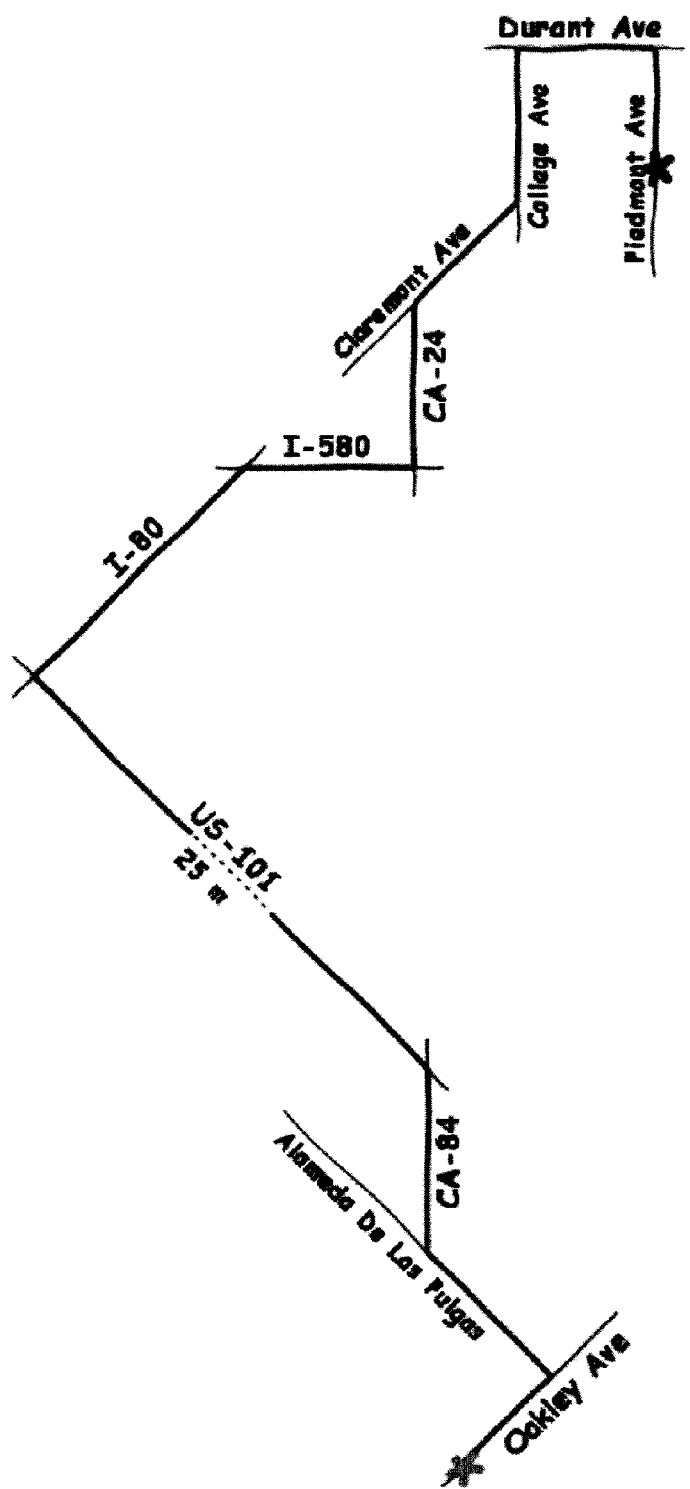
FIG. 5 is a map that is generated in accordance with one embodiment of the present invention.

Generating a computer-based map in accordance with the above identified design goals is more difficult than generating a map in conventional computer-based styles. Variable road scaling provides some flexibility in choosing the length of each road to produce a clear and readable map. However, the relative ordering of roads by length must remain fixed and false intersections should not be introduced into the map. The space of all possible route-map layouts is extremely large, and therefore it is not feasible to blindly search for a layout that satisfies the design goals of the present invention. Rather, a multi-phase heuristic generate-and-test approach is used to obtain a map that satisfies the design principles of the present invention. FIG. 5 illustrates a map generated using the methods of the present invention.

General Architecture

Figure 6:
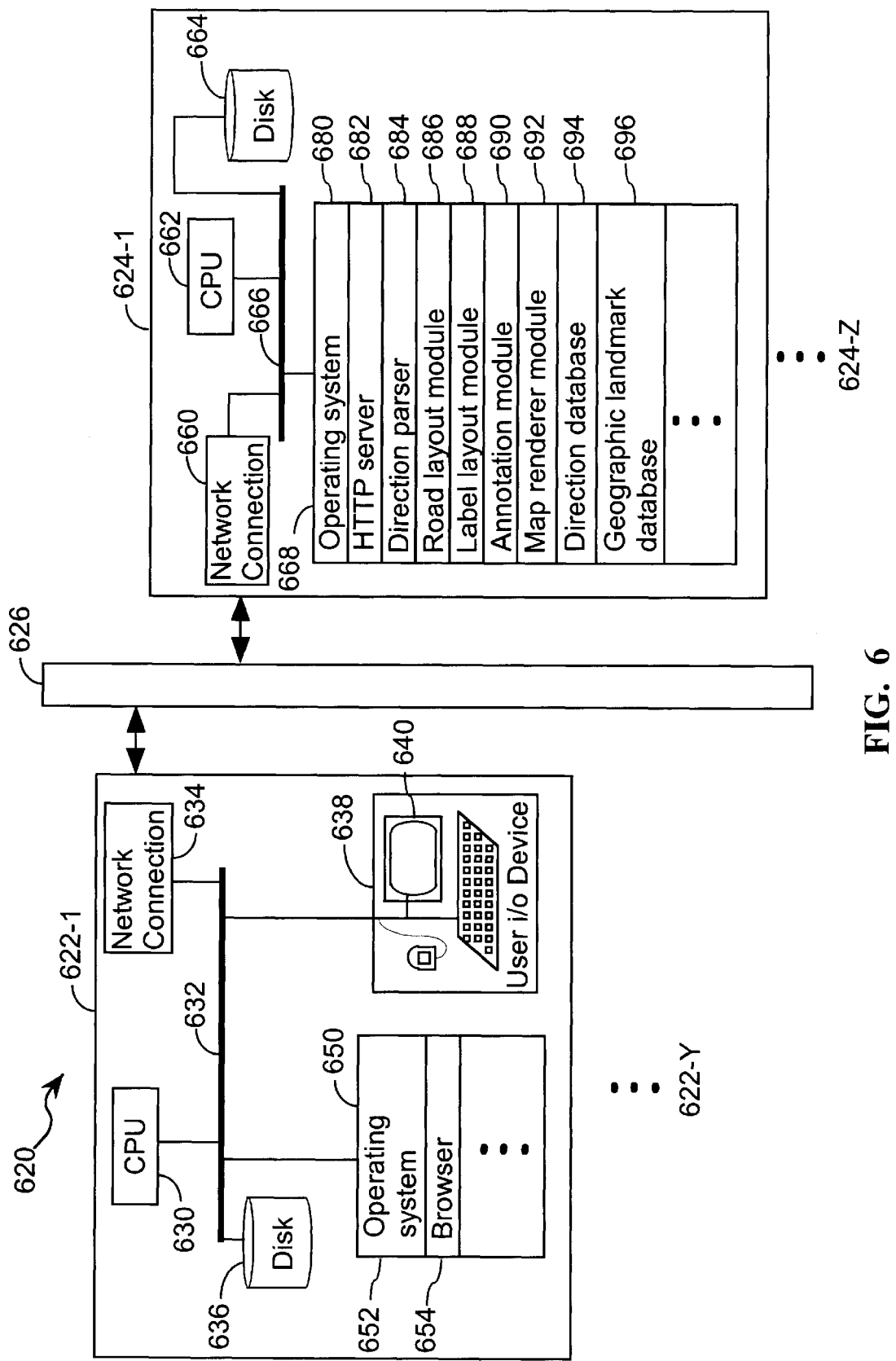
FIG. 6 illustrates a system for generating a route map in accordance with one embodiment of the present invention.

Attention now turns to FIG. 6, which is a system in accordance with one embodiment of the present invention. FIG. 6 illustrates a network 620 that is operated in accordance with the present invention. Network 620 includes at least one user computer 622 and at least one server computer 624. User computer 622 and server computer 624 are connected by transmission channel 626, which may be any wired or wireless transmission channel.

User computer 622 is any device that includes a Central Processing Unit (CPU) 630 connected to a random access memory 650, a network connection 634, and one or more user input/output ("i/o") devices 638 including output means 640. In some embodiments, system memory 650 includes read-only memory (ROM). Output means 640 is any device capable of communicating with a human and includes, for example, a monitor, voice user interfaces, and/or integrated graphic means such as mini-displays present in web-phones. Typically, user computer 622 includes a main non-volatile storage unit 636, preferably a hard disk drive, for storing software and data. Further, user computer 622 includes one or more internal buses 632 for interconnecting the aforementioned elements. In a typical embodiment, memory 650 includes an operating system 652 and an Internet browser 654.

In some embodiments of the present invention, user computer 622 is a hand held device such as a Palm Pilot. Accordingly, in such embodiments, it is possible that user computer 622 does not have disk 636 and browser 654 is integrated seamlessly into operating system 652.

Server computer 624 includes standard server components, including a network connection device 660, a CPU 662, a main non-volatile storage unit 664, and a random access memory 668. Further, server computer 624 includes one or more internal buses 666 for interconnecting the aforementioned elements. Memory 668 stores a set of computer programs, modules and data to implement the processing associated with the invention. In particular, a preferred embodiment of memory 668 includes an operating system 680 and a HTTP server 682. Memory 668 further includes direction parser 684, road layout module 686, label layout module 688, annotation module 690, and map renderer module 692. In some embodiments of the present invention, memory 668 also includes a direction database and/or geographical landmark database 696.

Direction parser 684 reads directions from a source, such as a file external or internal database. Directions parser 684 translates the directions into a graph. Nodes in the graph represent intersections, and edges represent the roads connecting the intersections. In one embodiment, system 620 does not contain a database of roads. Rather, all the information about the map is obtained from text directions stored offsite. In another embodiment, server 624 contains direction database 694, which is used to identify a suitable route between an origination and a destination.

After directions have been parsed by direction parser 684, roads in the route map are scaled with road layout module 686. In one embodiment, road layout module 686 applies a constant scale factor to the entire map so that the map fits in a viewport having predetermined dimensions. As a result of this uniform scaling, the map often contains many roads that are too small to see or label. To remedy this, each road in the map, beginning with the smaller roads, is scaled by road layout module 686 until roads in the map are clearly visible. Since the length of roads is only increased in this step, the map ends up being larger than the size of the viewport. Thus, in subsequent steps, certain aspects of the map are reduced to yield a map that fits the dimensions of the desired viewport.

In one embodiment of the present invention, the size of the map is reduced by repeatedly initiating a tracing procedure. In this embodiment, road layout module 686 executes the tracing procedure until the entire route is traced without identifying a road that exceeds the dimensions of the viewport. In the tracing procedure, each successive road in the route is examined, beginning at the route origin, until a road extending outside the viewport, i.e. an offending road, is identified. When an offending road is identified, each road that had been traced is examined to see if it is capable of being shortened. A road candidate is capable of being shortened if it is (i) longer than a specified minimum length, (ii) the relative ordering of the roads by length remains fixed even after the candidate has been shortened, and (iii) false intersections are avoided. In one aspect of this embodiment, road layout module 686 shortens road candidates using a greedy approach so that the candidate is shortened as much as possible, in order from longest to shortest, until the offending road is pulled back inside the viewport.

Figure 10:
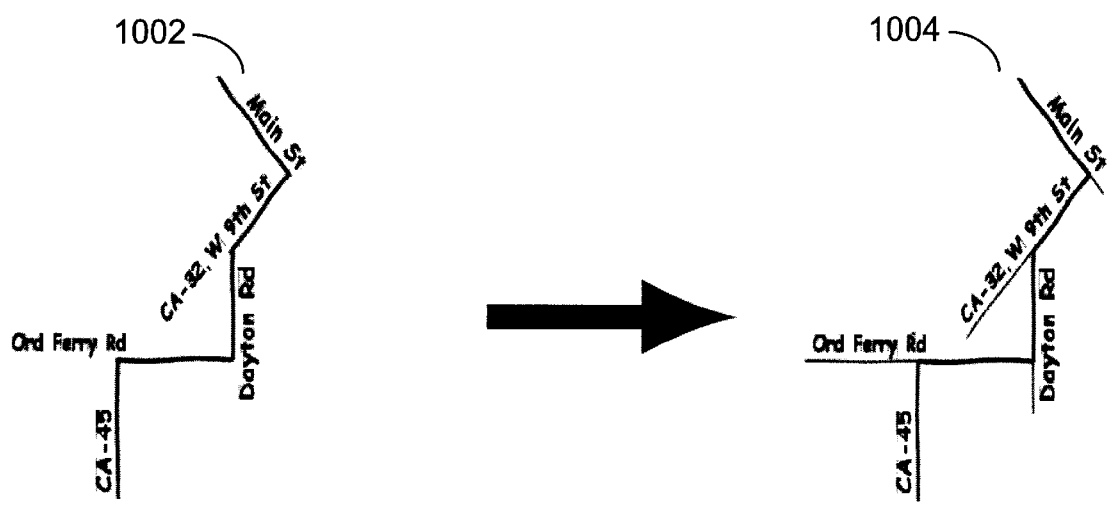
FIG. 10 illustrates a map before and after road extensions are made so that labels are optimally associated with corresponding roads.

Label layout module 688 is used to place labels on the scaled map produced by road layout module 686. To date, proper labeling of individual roads has been an intractable problem. Label layout module 688 solves this problem by refining a novel target function using a simulated annealing schedule. Simulated annealing has been used to refine label positions in prior art methods. Edmondson et al., Cartographica 33, 1997, 12–23. However, unlike Edmondson, which uses a limited set of discrete label positions, the present invention considers a continuous range of positions for label placement, and label placements are not limited to positions that are directly above or below the road. Furthermore, the present invention uses a more comprehensive target function that considers the number of roads each label intersects, the number of labels each label intersects, the distance the label is from the center of the road associated with the label, and whether the label is above or below the associated road. Finally, the present invention is advantageous because roads are extended when the label corresponding to the road is lengthy Annotation module 690 adds decorations, such as road extensions, to the route map of the present invention. Further, module 690 adds an icon for route start and end points. Road extensions accentuate reorientation points, and allow for a larger range of label positions to be considered. In this phase, all roads are extended by a small fixed amount. Then only those roads that need to be extended for the chosen labeling pattern are further lengthened. FIG. 10 illustrates the advantages of applying road extensions. In FIG. 10, 1002 represents a road map prior to road extension whereas 1004 represents the same road map after road extension. Labels now fit the corresponding roads and the map is easier to read. Geographic and/or commercial landmarks are added to the route map by annotation module 690 to help guide the user through the desired route. In one embodiment, such landmarks are obtained from geographic landmark database 696.

Map renderer module 692 renders the scaled route map. In this phase, a "sketchy" pen-and-ink style is applied to each road in the route map. That is, instead of drawing roads as straight lines, variation is introduced in the bend and width of each road to generate a hand-drawn look. In an approach similar to that of Markosian et al., SIGGRAPH 97 Conference Proceedings, 1997, 415–420, each road is broken into small segments and the position of each point is slightly shifted both normal and tangent to the segment direction. These points are then joined with a non-uniform rational b-spline (NURB) to create the final stroke. A NURB is a curve that interpolates data. Thus, given a set of points, a curve is generated passing through all the points. The thickness of the roads is then adjusted to emphasize the route and de-emphasize road extensions generated by annotation module 690.

Now that an overview of the processing steps in accordance with one embodiment of the invention have been disclosed, a number of advantages of the present inventions are apparent. First, the present invention discloses a method for automatically generating a route map that has the clarity of a hand-drawn map. Such a map is produced by using a novel scaling function in which each road is scaled individually using the design criteria of the present invention. Further, a novel method for positioning labels on the map is disclosed. The refined label positions help provide a route map having improved clarity.

Map Scaling

Attention now turns to detailed embodiments of road layout module 686. The present invention contemplates several different implementations of road layout module 686. The different road layout module 686 embodiments contemplated by the present invention include but are not limited to uniform scaling, fixed non-uniform scaling, as well as refinement of individual scale factors using a greedy search or simulated annealing schedule.

In uniform scaling embodiments, a single scale factor that allows the graph created by direction parser 684 to fit in a desired viewport is computed. For viewports that are defined as an x by y pixel array, a single scale factor, pixelsPerMile, is computed by an assignment such as:

pixelsPerMile=ComputePixelsPerMile( );

in which the function ComputePixelsPerMile( ) determines the maximum number of pixels a mile of the route may have without causing the overall route to exceed the desired pixel-based viewport. One of skill in the art will appreciate that a single scale factor for viewports that are based on metrics other than pixels can be computed using functions analogous to ComputePixelsPerMile( ). Once a uniform scale factor has been identified by a function such as ComputePixelsPerMile( ), the uniform scale factor is applied to the length of each road, and intersection points between consecutive pairs of roads is updated to reflect the change in length of the roads. For pixel-based viewports, the application of the uniform scale factor to each road reduces to a conversion of miles to pixels. Thus, in such embodiments, the application of the constant scale factor to each road takes the form:

(101) for each Road r {
(102) r.lengthPxls=r.lengthMiles*pixelsPerMile;
(103) }
(104) SetRoadIntersectionPts( );

In fixed non-uniform scaling embodiments, road layout module 686 includes a rescaleByBucket( ) function that breaks the range of road lengths (0, infinity) found in the route into N consecutive buckets $[0, x_1), [x_1,x_2), \ldots [X_{N-1}, X_N), [X_N,$ infinity). The function then scales the roads differently depending on which bucket they fall in. Small roads, those in the earlier buckets, are scaled to be longer, while longer roads are scaled to be shorter. In one embodiment, roads falling in the final bucket are capped at some maximum length. In another embodiment, roads falling in the first bucket are not allowed to fall below a minimum length. In yet another embodiment, the scale factor that is chosen for each bucket is subject to the constraint that the relative ordering of the roads by length remains fixed. In embodiments in which the route is to be scaled to a pixel-based viewport, each road is scaled by the uniform scale factor computed by the ComputePixelsPerMile( ) function described in the uniform scaling embodiment. Thus, one implementation in accordance with the non-uniform scaling embodiment, has the steps:

(201) LayoutRoads( )
(202) {
(203) for each Road r {
(204) r.lengthMiles=rescaleByBucket(r.lengthMiles);
(205) r.lengthPxls=r.lengthMiles*pixelsPerMile;
(206) }
(207) SetRoadIntersectionPts( );
(208) }

Figure 7:
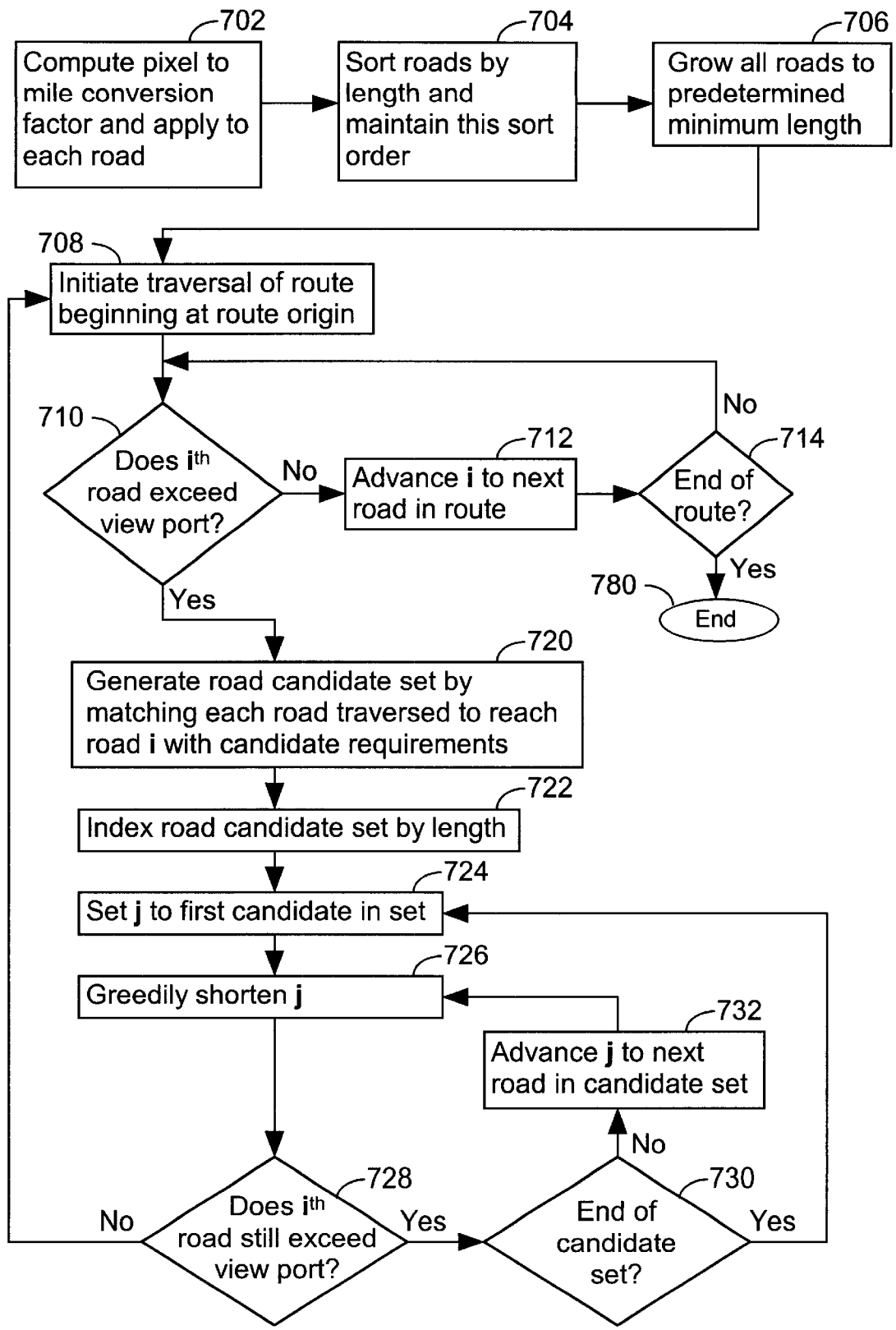
FIG. 7 illustrates the processing steps used to optimize the length of individual roads in a route map using a greedy algorithm, in accordance with one embodiment of the present invention.

Attention now turns to FIG. 7 which illustrates an embodiment of the present invention in which road layout module 686 refines the length of roads in the map using a greedy search algorithm. In processing step 702, road layout module 686 first computes a pixel to mile conversion factor and applies this factor to each road in the map so that the map fits into the desired viewport. Then, in processing step 704, the roads are sorted by length. The relative order of the roads, in terms of length, in the map as determined in processing step 704 is maintained throughout the remainder of the processing steps illustrated in FIG. 7. In some embodiments deviations in this relative ordering is allowed upon payment of a penalty. In processing step 706, all small roads are grown until each road is longer than a set minimum length. Because processing step 706 only lengthens roads, the route map is not likely to fit in the desired viewport after processing step 706 has been executed.

To reduce the map so that it fits into the desired viewport, a search for roads that can be shortened is performed. In processing step 708, the route is traversed from the route origin. Each route in the road is examined (710–714) until a road that extends outside the viewport (offending road) is identified. When such a road is identified (710-Yes), a list of candidate roads in the portion of the route that had been traversed prior to identifying the offending road is collected (720). To qualify as a candidate road, a traversed road must be capable of being shortened without changing the relative ordering of the roads by length and without falling below a minimum road length. Further, a candidate road must be capable of being shortened without creating any false intersections between roads. Finally, the candidate road should be oriented within ±90 degrees of the offending road. Once a road candidate set has been generated, it is ordered by length, from longest to shortest (722).

Once the candidate roads have been ordered, a shortening process is initiated. The shortening process takes advantage of the computational efficiency of a greedy algorithm to shorten the roads (724). The shortening process cycles through each candidate road in the ordered set of candidate roads and shortens the candidate as much as possible (726) before advancing to the next candidate in the ordered set (732). After the greedy algorithm is applied to a candidate road, a check is made to see if the offending road has been pulled back inside the viewport (728). If the offending road has been pulled back into the viewport (728-No), the shortening process ends and control returns to processing step 708.

When the greedy algorithm has been applied to each candidate road in the ordered set without successfully pulling the offending road into the viewport (730-Yes), the shortening process repeats the process of applying the greedy algorithm to each road in the candidate list (724) until the offending road is pulled back into the viewport (728-No). The process in FIG. 7 continues until the complete route can be traversed without identifying a road that exceeds the dimensions of the viewport (714-Yes, 780). If such a traversal fails, the shortening process of steps 720–732 is executed and a new attempt to traverse the route is initiated 708.

At times, an identified road that matches the candidate requirements indicated above will not be added to the road candidate set because there is some other road in the route that is the same length. Roads that have the same length as the identified road are termed blocking roads. If there is a blocking road, the identified road cannot be added to the road candidate set because, if it were shortened, the relative ordering of roads by length, as identified in processing step 704, would be destroyed. The occurrence of blocking roads is of interest because, in some circumstances, they prevent the processing steps of 724–732 from pulling the offending road into the viewport (728-No). In some embodiments, when a certain number of iterations of processing steps 724 thru 732 fail to effect a solution (728-No) one or more of the blocking roads are shortened using the greedy algorithm discussed previously. Then, if the offending road still exceeds the dimensions of the viewport, a new road candidate set is generated (720) and processing steps 724 thru 732 are executed until the offending road no longer exceeds the dimensions of the viewport (728-No).

Figure 8:
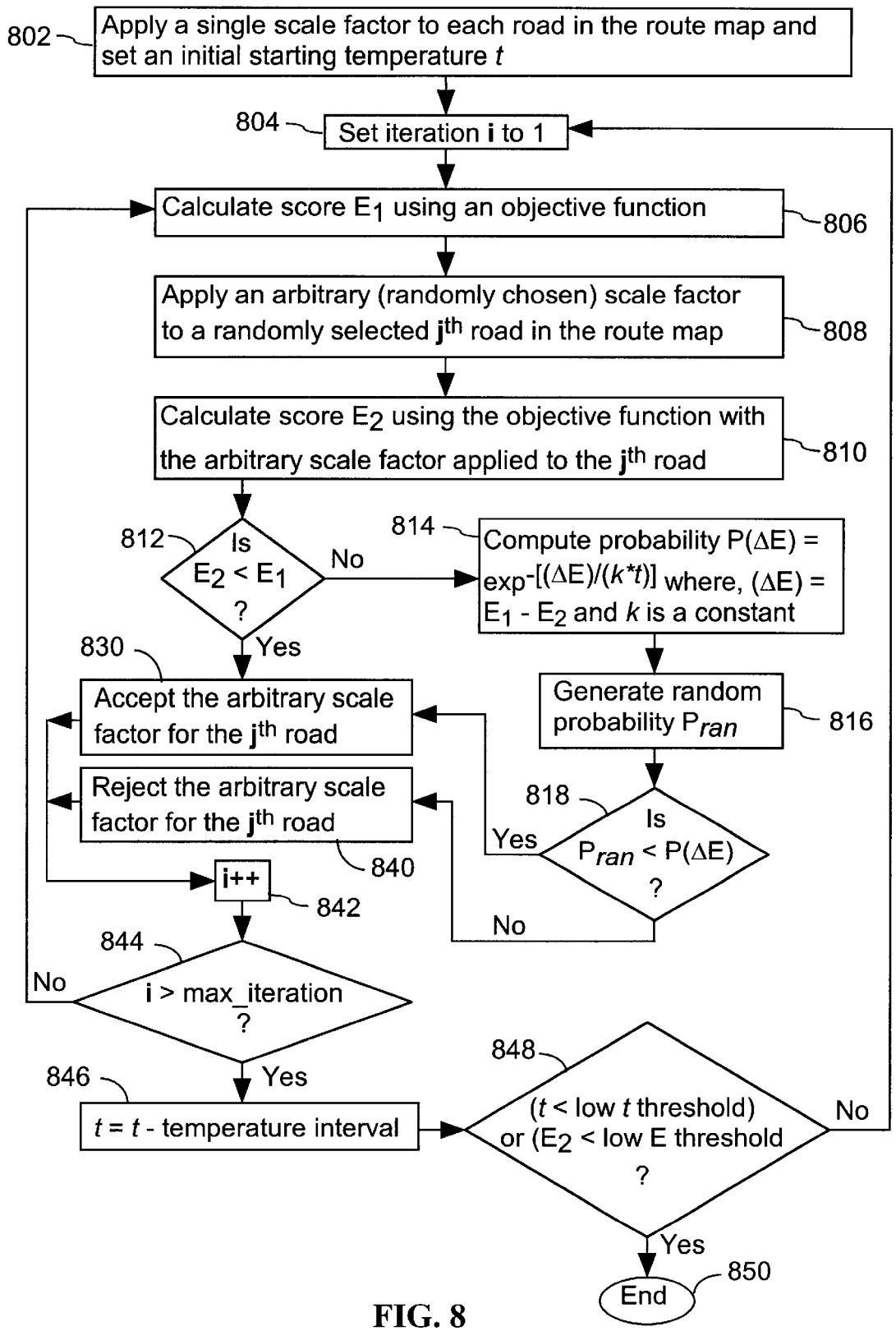
FIG. 8 illustrates the processing steps used to optimize the length of individual roads in a route map using a simulated annealing schedule, in accordance with one embodiment of the present invention.

FIG. 8 illustrates another embodiment of road layout module 686 in which the length of roads in the map are refined with a simulated annealing schedule. In processing step 802, a single scale factor is applied to each road in the route map. In one embodiment, which is in accordance with this aspect of the invention, the scale factor is used to size the map produced by direction parser 684 so that it fits within the dimensions of the desired viewport. In another embodiment, the map is sized so that each road in the map is longer than a selected minimum length so that each road in the map is legible in the desired viewport.

In the second phase of processing step 802, an initial temperature t is chosen. It will be appreciated that any temperature t may be chosen in processing step 802. One of skill in the art will further appreciate that the refinement of an objective function using simulated annealing is most effective when high temperatures are chosen. There is no requirement that this temperature adhere to any physical dimension such as degrees Celsius, etc. Indeed, the dimensions of the temperature t used in the simulated annealing schedule adopts the same units as the objective function that is the subject of the optimization. In one embodiment, a starting temperature that is readily reduced by ten percent on a periodic basis is chosen, such as 1.0/log(3)*3. In another embodiment, the starting value of t is based on a function of one or more of the characteristics of the route to be scaled, such as the number of roads in the route, the number of intersections in the route, and/or the length of the route. In another embodiment, the starting value of t is selected based on the amount of resources available to compute the simulated annealing schedule. For example, the starting value of t is reduced below a pre-specified default value when the annealing schedule is to be run on a server that is currently refining several other routes or on a relatively slower client. In still another embodiment, the starting value of t is related to the form of the probability function used in processing step 814. It has been found, in fact, that the temperature does not have to be very large to produce a substantial probability of keeping a worse score. Therefore, in some embodiments, starting temperature t is not large.

Once a single scale factor has been applied to each road in the route map and an initial starting temperature has been assigned, an iterative process begins. A counter is initialized in processing step 804 and, in processing step 806, the quality of the map ($E_1$) is assessed using an objective function. It will be appreciated that the utility of the map produced by the simulated annealing schedule is dependent upon the development of an objective function that accurately balances the various features of the map that need to be optimized. In one embodiment, the objective function is dependent upon the number of false intersections each road in the route makes, the number of roads in the route that no longer have the same relative length that they had before the simulated annealing schedule was initiated, and the number of roads that fall below a minimum length. An objective function in accordance with this embodiment is:

$$\left[\sum_{i=1}^{N} w_1^* \text{false\_intersection}_i\right] +$$

$$[w_2^* \text{Num\_w/o\_rel\_len}] + [w_3^* \text{num\_short\_roads}]$$

$$[W_3 * \text{num\_short\_roads}]$$

where, $w_1$, $w_2$ and $w_3$ are independently selected weights;

false_intersections is the number of false intersections road i makes;

N is the number of roads in the route;

num_w/o_rel_len is the number of roads that no longer have the same relative length that they had before simulated annealing schedule was initiated; and num_short_roads is the number of roads that are shorter than a minimum length threshold.

After the quality ($E_1$) of the map has been measured using the objective function, a scale factor is randomly generated and applied to a randomly selected road (808). In one embodiment, the scale factor is randomly chosen from a permissible range, such as zero to two. Thus, in such an embodiment, a random number generator is used to identify a number in the range zero to two, such as "0.6893." The random number is then applied to a randomly selected road in the route as a scale constant. For example, if the number is "0.6893" and the randomly selected road is the $j^{th}$ road in the route map, the $j^{th}$ road is shortened by 31.07 percent. In another embodiment, the permissible range for the random number is −0.1 to 0.1 and therefore, in such embodiments, application of the randomly chosen scale constant is capable of altering the length of the $j^{th}$ road by no more than ten percent.

After the length of the $j^{th}$ road has been adjusted by the scale factor, the quality of the map ($E_2$) is calculated using the same objective function used in processing step 806 (810). When the quality of the map has improved ($E_2 < E_1$) (812-Yes), then the change made to the length of the $j^{th}$ road is accepted (830). When the quality of the map has not improved ($E_2 > E_1$) (812-No) there is a probability $$1 - \exp^{-[(\Delta E)/k^* t]} \tag{1}$$

that the change in processing step 808 is still accepted. From the form of equation (1), it will be appreciated that the probability that the change is accepted, when ($E_2 > E_1$), is reduced at lower temperatures t. Equation (1) is implemented as processing steps 814 thru 818 in FIG. 8. In processing step 814, $\exp^{-[(\Delta E)/k^* t]}$ is computed. In processing step 816, a number $P_{ran}$ in the interval 0 to 1 is generated. If $P_{ran}$ is less than $\exp^{-[(\Delta E)/k^* t]}$ (818-Yes), the change made to the $j^{th}$ road in processing step 808 is accepted (830). If $P_{ran}$ is more than $\exp^{-[(\Delta E)k^*t)]}$ (818-No), the change made to the $j^{th}$ road in processing step 808 is rejected (840). It will be appreciated that probability functions other than that disclosed in equation (1) are within the scope of the present invention.

Acceptance of conditions ($E_2 > E_1$) on a limited probabilistic basis is advantageous because it provides the refinement system with the capability of escaping local minima traps that do not represent a global solution to the objective function. One of skill in the art will appreciate, therefore, that probability functions other than that of equation (1) will advance the goals of the present invention. Representative probability functions include, for example, functions that are linearly or logarithmically dependent upon temperature, rather than exponentially dependent on temperature as described in equation 1.

Processing steps 806 thru 840 represent one iteration in the refinement process. In processing step 842 an iteration count is advanced. When the iteration count does not exceed the maximum iteration count, the process continues at step 806 (844-No). When the iteration count equals a maximum iteration flag (844-Yes), temperature t is reduced (846). One of skill in the art will appreciate that there are many different types of schedules that are used to reduce temperature t in various embodiments of processing step 846. All such schedules are within the scope of the present invention. In one embodiment, temperature t is reduced by ten percent. In another embodiment, temperature t is reduced by a constant value. For example, the starting temperature set in processing step 802 could be 20,000 and this temperature could be reduced by 300 each time processing step 846 is executed. In another embodiment the percentage decrease in temperature in processing step 846 is calculated as a function of the number of roads to be scaled.

When the temperature has been reduced by an amount in processing step 846, a check is performed to determine whether the simulated annealing schedule should be terminated (848). In the embodiment illustrated in FIG. 8, the process is terminated (848-Yes, 850) when temperature t has fallen below a low temperature threshold or $E_2$ falls below a predetermined low energy threshold. The low temperature threshold is any suitably chosen temperature that allows for a sufficient number of iterations of the refinement cycle at relatively low temperatures. When it is determined that the annealing schedule should not end (848-No), the process continues at step 804 with the reinitialization of iteration count i.

In another embodiment of the present invention, a distinctly different exit condition than the one illustrated in FIG. 8 is used. In this alternative embodiment, a separate counter is maintained. This counter, which could be termed a stage counter, is incremented each time t is reduced in step 846. When the stage counter has exceeded a predetermined value, such as fifty, the simulating annealing process ends (850). In yet another embodiment, a counter tracks a consecutive number of times the arbitrary scale factor is rejected (840). When a set number of arbitrary changes in a row have been rejected, the route map is considered optimized and the process ends (850).

Map Annotation

In one embodiment, annotation module 690 is used to deterministically place landmarks on the map after the map has been scaled by road layout module 686. In one aspect of this embodiment, the landmarks represent points of geographical interest and help to guide the user through the route to the destination. In another embodiment, the landmarks represent a form of advertisement that is paid for by subscribers. In one example in accordance with such embodiments, the subscriber is a fast food chain and the landmarks represent the location of each fast food franchise that is associated with the fast food chain. It will be appreciated that an important advantage of the present invention is that the route maps do not contain superfluous content. Thus, the route maps of the present invention are particularly well suited for use in conjunction with geographical landmarks that are paid for by subscribers. In one embodiment of the present invention, memory 668 of server 624 includes a geographical landmark database 696 that is populated with landmarks that have been provided by and paid for by advertisers.

Label Refinement

Identification of an optimal position for each label in the route map improves the quality of the map because clutter and object overlap is reduced. The present invention optimizes label position by minimizing a novel target function that scores the position of a label using a unique set of label parameters. Importantly, rather than considering a small number of discrete positions for label placement, a continuous range of positions within a region around the center of the road corresponding to the label are considered. This region includes positions that are not directly above or below the road being labeled. When a position that is not directly above or below the road is selected, the road is extended to the position of the label.

Figure 9:
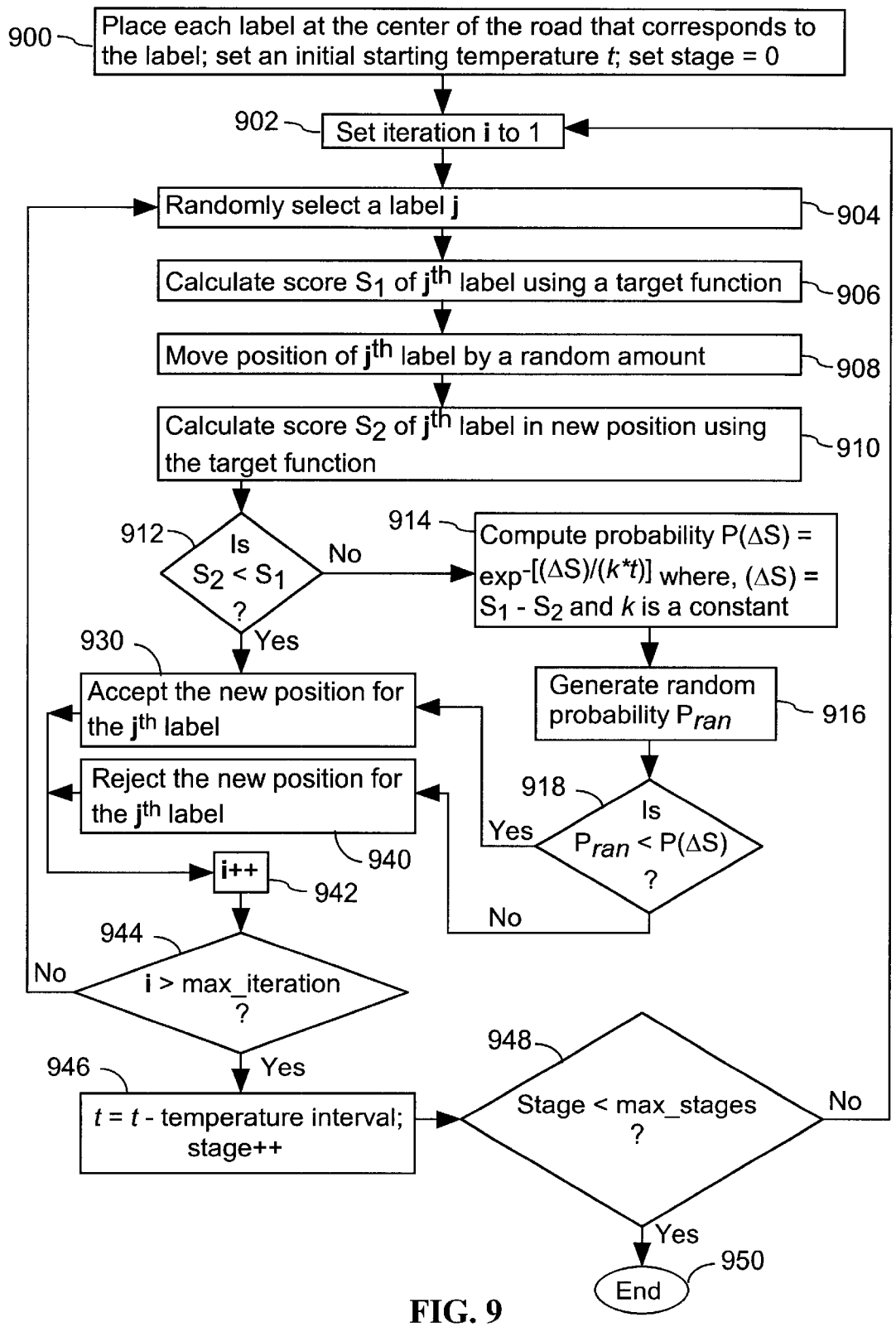
FIG. 9 illustrates the processing steps used to optimize label positions in a route map using a simulated annealing schedule, in accordance with one embodiment of the present invention.

In one embodiment, the target function is optimized using a simulated annealing schedule. FIG. 9 illustrates one embodiment in accordance with the present invention. In processing step 900, each label is placed at the center of the road corresponding to the label and an initial temperature t is selected. It will be appreciated that temperature t may be set to wide range of possible temperatures in processing step 900. In one embodiment, a starting temperature that is readily reduced by ten percent on a periodic basis, such as $1.0/\log(3)*3$, is chosen. In another embodiment, the starting temperature is based on a function of one or more of the characteristics of the route to be optimized, such as the number of labels in the route, the number of landmarks in the route, and/or the length of the route. In another embodiment, the starting temperature is selected based on the amount of resources available to perform the simulated annealing calculations. For example, the initial temperature is set to a low value when the annealing schedule is to be run on a server that is currently refining several other routes or a client with a relatively slow central processing unit. In still another embodiment, the starting temperature t is determined by the nature of the probability function that is used to accept scores having $S_2 > S_1$.

In processing step 902 the stage counter is set to zero. The stage counter is incremented each time temperature t has been reduced. Once the initialization steps of processing step 900 have been performed, counter i is set to one (902) and a label j is randomly selected (904). The quality of the position of the $j^{th}$ label ($S_1$) is measured using a target function in processing step 906 and in processing step 908 the $j^{th}$ label is repositioned by a random amount. In step 908, the quality of the repositioned $j^{th}$ label ($S_2$) is measured. An important advantage of the present invention is that the $j^{th}$ label is repositioned into any of a continuous range of values rather than a limited number of discrete positions. Further the target function used to compute $S_1$ and $S_2$ provides an improved method for assessing the quality of a label position. In one embodiment the target function includes the following components:

(301) collect all objects that intersect the $j^{th}$ label
(302) for each intersecting object {
(303) case ROAD:
(304) score+=ROAD_PENALTY;
(305) case LABEL:
(306) score+=LABEL_PENALTY;
(307) case ANNOTATION:
(308) score+=ANNOTATION_PENALTY; }

In line 301, all the objects that intersect the $j^{th}$ label are collected. Such objects include, for example, roads, other labels, and annotations such as landmarks. The target function loops through each of the collected objects (line 302). When the object is a road, a road penalty is added to the score (line 304), when the object is a label, a label penalty is added to the score (line 306) and when the object is an annotation, an annotation penalty is added to the score (line 308).

In some embodiments, the target function includes one or more additional components. One such component is an off screen penalty. When the $j^{th}$ label is positioned such that a portion of the label exceeds the boundary of the viewport, an off screen penalty is added to the score. Another component is a "distance from the center of the corresponding road penalty." This penalty is determined by taking the product of a centering penalty and the normalized distance of the $j^{th}$ label from the road center. Additional components in the target function represent various constraints that are imposed on the label position. Constraints are used to bias label positions that are consistent with label position design criteria. For example, in one embodiment, it is preferable to position a label above the road rather than below the road. Thus, a below_the_road constraint penalty is added to the score of a label position that is below the road corresponding to the label. Another constraint penalty asks whether a road should be extended so that the road runs alongside the label. When it is determined that a road extension will provide better label to road correspondence, a road extension penalty is added to the target function score. Yet another constraint penalty is used when the label is positioned far away from the center of the corresponding road. In such cases, an arrow is positioned on the map to indicate the relationship between the label and the corresponding road and an arrow penalty is added to the target function.

In one embodiment, the target function has the form:

(401) float score=0.0;
(402) // Get all the objects that intersect the label
(403) for each object {
(404) case ROAD:
(405) score+=ROAD_PENALTY;
(406) case LABEL:
(407) score+=LABEL_PENALTY;
(408) case ANNOTATION:
(409) score+=ANNOTATION_PENALTY;
(410) }
(411) // Is label completely visible on viewport?
(412) if not {
(413) score+=OFF_SCREEN_PENALTY;
(414) }
(415) score+=normalized distance from road center * CENTERING_PENALTY;
(416) score+=constraint penalty;
(417) return score;

When the quality of the $j^{th}$ position has improved ($S_2 < S_1$) (912-Yes), the new label position for the $j^{th}$ label is accepted (930). When the quality of the map has not improved ($S_2 > S_1$) (912-No) there is a probability $$1 - \exp^{-[(\Delta S)/k*t)]} \qquad (2)$$

that the new label position for the $j^{th}$ label will be accepted. From the form of equation (2), it will be appreciated that, for cases in which ($S_2 > S_1$), the probability that the change in label position will be accepted diminishes as temperature t is reduced. Equation (2) is implemented as processing steps 914 thru 918 in FIG. 9. In processing step 914, $\exp^{-[(\Delta S)/k*t)]}$ is computed. In processing step 916, a number $P_{ran}$, in the interval 0 to 1, is generated. If $P_{ran}$ is less than $\exp^{-[(\Delta S)/k*t)]}$ (918-Yes), the change made to the $j^{th}$ label position in processing step 908 is accepted (930). If $P_{ran}$ is more than $\exp^{-[(\Delta S)/k*t)]}$ (918-No), the change made to the $j^{th}$ label position in processing step 908 is rejected (940). It will be appreciated that probability functions other than the function shown in equation (2) and processing step 914 are within the scope of the present invention. Indeed, any probability function that is dependent upon time is suitable.

Processing steps 904 thru 940 represent one iteration in the annealing process. In processing step 942, an iteration count is advanced. When the iteration count does not exceed the maximum iteration count (944-No), the process continues at step 904. When the iteration count equals a maximum iteration flag (944-Yes), temperature t is reduced and the stage counter is advanced (946). One of skill in the art will appreciate that there are many possible different types of schedules that are used to reduce temperature t in various implementations of processing step 946. All such schedules are within the scope of the present invention. In one embodiment, temperature t is reduced by ten percent each time processing step 946 is executed. In another embodiment the percentage decrease in temperature t in processing step 946 is calculated as a function of the number of labels to be scaled. After processing step 946, a check is performed to determine whether the simulated annealing schedule should be terminated (948). When it is determined that the annealing schedule should not end (948-No), the process continues at step 902 with the reinitialization of iteration count i.

In the embodiment illustrated in FIG. 9, the process is terminated (948-Yes, 950) when a maximum number of stages has been executed. In one embodiment, the maximum number of stages executed is fifty. In embodiments other than that illustrated in FIG. 9, criteria other than the stage count is used in processing step 948 to determine when the simulated annealing process should be terminated. Such criteria include terminating the process when temperature t has fallen below a low temperature threshold, when $E_2$ or $E_1$ falls below a predetermined low energy threshold, or the consecutive number of times the new label position has been rejected exceeds a threshold value.

Map Rendering

The final phase of the process is the rendering of the route by map renderer module 692. In this phase, the route map is humanized. In some embodiments, techniques used to humanize the map include casting the roads in a "sketchy" pen-and-ink style, adding a breakage symbol to long roads that have been significantly scaled down by road layout module 686, providing an indication of road length for long roads in the route, adding an arrow to indicate which way is North, and/or adding insets that show enhanced route detail.

Map renderer module 692 produces the "sketchy" style by breaking each road into small segments and slightly shifting the position of each segment both normal to the stroke direction and along the stroke directions. The rotated segments are then joined with a NURB to create the final stroke. Further, the thickness of the roads is adjusted to emphasize the route and de-emphasize route extensions. In a preferred embodiment, a and-drawn font is used for the labels.

Concluding Remarks

The efficient use of data structures and acceleration techniques is useful in implementing the methods disclosed in the present invention. Typically, the search algorithms described herein require a significant number of iterations to converge, and scoring is done on each iteration. Often, scoring involves determining whether various objects in the map intersect, and the costs of these intersection calculations should be minimized. One way to minimize the cost of such calculations is to use a two-dimensional partitioning grid to subdivide the display and reduce the number of possible candidate objects for any intersection calculation.

It is also possible to significantly reduce the computational overhead of the search algorithms by performing a simple analysis before commencing a search. In many cases, the algorithm can determine the optimal length of a road or the optimal placement of a label will not detrimentally affect the size or placement of other roads or labels on the map. Therefore, these attributes can be assigned a priori thus reducing the size of the search space and reducing the running time of the algorithm.

Alternate Embodiments

The present invention can be implemented as a computer program product that includes a computer program mechanism embedded in a computer readable storage medium. For instance, the computer program product could contain direction parser 684, road layout module 686, label layout module 688, and map renderer module 692 (FIG. 6). These program modules may be stored on a CD-ROM, magnetic disk storage product, or any other computer readable data or program storage product. The software module in the computer program product may also be distributed electronically, via the Internet or otherwise, by transmission of a computer data signal (in which the software modules are embedded) on a carrier wave.

It will be appreciated that, while reference was made to route maps that include roads, the present invention encompasses route maps of any kind. Thus, the route maps of the present invention include, but are not limited to, hiking trails, campus directions, and graphical representations of mass transportation networks in addition to road maps. Further, it will be appreciated that although reference is made in FIG. 6 to a system for generating a route map having a client/server format, many embodiments of the present invention are practiced using a single computer that is not necessarily connected to the Internet. Further still, it will be appreciated that the distribution of software modules shown in FIG. 6 is merely exemplary. For instance, embodiments in which direction parser 684, road layout module 686, label layout module 688, annotation module 690, map renderer module 692, direction database 694, and geographical landmark database 696 independently reside on client 622 and/or server 624 fall within the scope of the present invention.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in an order to best explain the principles of the invention and its practical applications, to thereby enable others skilled in the art to best utilize the invention and various modifications as are suited to the particular use contemplated. It is intended that the scope of the invention be defined by the following claims and their equivalents.

We claim:

1. A method of preparing a route map that describes a path between a start and an end, said method comprising:

obtaining said path from said start to said end, said path comprising an initial set of elements, each said element including sufficient information to determine a direction and each said element intersecting at least one other element in said initial set of elements; a first element in said initial set of elements including said start and a second element in said initial set of elements including said end;

independently applying a different scale factor to each of at least two elements in said initial set of elements; wherein application of said different scale factor to each of said at least two elements produces a scaled set of elements; and outputting a rendering of each element in said scaled set of elements.

2. The method of claim 1, wherein a value of each said different scale factor is subject to the constraint that the relative ranking, based on length, of each element in said scaled set of elements is the same as the relative length of the corresponding element in said initial set of elements.

3. The method of claim 1, wherein said applying step further comprises:

associating each element in said initial set of elements with a bin, selected from a set of bins, based on a length of said element; each bin in said set of bins representing a range of element lengths that does not overlap with a range of element lengths represented by another bin in said set of bins; and providing each bin with a different bin scale factor;

wherein each said different scale factor applied to each element in said initial set of elements is the bin scale factor that corresponds to the bin to which said element is associated.

4. The method of claim 1, wherein said route map includes a bounding edge and each said different scale factor is derived by:

(i) applying a single scale factor to each element in said initial set of elements to form said scaled set of elements; said single scale factor determined by a factor necessary to adjust a length of a shortest element in said initial set of elements so that said element has a length that exceeds a minimum length threshold;

(ii) traversing said path until a first element in said scaled set of elements exceeds said bounding edge; wherein, when an element exceeds said bounding edge, said method further comprises:

(a) noting each element that has been traversed in said traversing step having a length that is longer than said minimum length threshold and a direction that is within ninety degrees of the direction of said first element;

(b) indexing the elements noted in step (a) by a length, with a longest element first;
(c) sequentially selecting an element from said index, and for each selected element:
 (1) adjusting a different scale factor associated with said selected element to minimize the length of said element, with the proviso that the relative length of said element after application of said different scale factor is the same as the length of the corresponding element in said initial set of elements; and
 (2) determining whether said first element continues to exceed said bounding edge; wherein, when said first element no longer exceeds said bounding edge, step (ii)(c) is terminated; and
(iii) repeating step (ii) until no element in said scaled set of elements exceeds said bounding edge.

5. The method of claim 1 wherein the step of independently applying a different scale factor to each of at least two elements in said initial set of elements to produce said scaled set of elements comprises:
(a) applying a single scale factor to each element in said initial set of elements to form said scaled set of elements; said single scale factor determined by a factor necessary to adjust a length of a shortest element in said initial set of elements so that said shortest element has a length that exceeds a minimum length threshold;
(b) setting an initial temperature t;
(c) determining a first score ($E_1$) using an objective function that is determined by said scaled set of elements;
(d) providing an arbitrary scale factor for a randomly selected element in said scaled set of elements;
(e) calculating a second score ($E_2$) using said objective function;
(f) assigning said arbitrary scale factor to said randomly selected element:
 (1) when $E_2$ is less than $E_1$; and
 (2) with the probability $P(\Delta E)$, when $E_2$ is greater than $E_1$; where $P(\Delta E)$ is a probability function that is dependent upon temperature t;
(g) repeating steps (c) thru (f) for a first predetermined number of times;
(h) decreasing t by an amount; and
(i) executing steps (c) thru (h) until a first occurrence of an exit condition.

6. The method of claim 5 where:

$$P(\Delta E) = \exp^{-[(\Delta E)/(k*t)]}$$

$\Delta E = (E_1) - (E_2)$, and k is a constant.

7. The method of claim 5, wherein said exit condition occurs when step (i) has been repeated a second predetermined number of times.

8. The method of claim 5, wherein said objective function is a summation of:
(i) a first weight multiplied by a number of false intersections existing between elements in said scaled set of elements;
(ii) a second weight multiplied by a number of elements in said scaled set of elements that do not have the same relative length as a corresponding element in said initial set of elements;
(iii) a third weight multiplied by a number of elements in said scaled set of elements having a length that is shorter than a minimum length threshold; and
(iv) a fourth weight multiplied by the number of elements in said scaled set of elements having a vector varying by more than a predetermined number of degrees from a corresponding element in said initial set of elements.

9. The method of claim 1, wherein said obtaining step further includes identification of a geographic marker; and said method further comprising the step of positioning said geographic marker deterministically at a position relative to said scaled set of elements; and
said outputting step further comprises the step of presenting said geographic marker at said position.

10. The method of claim 1, wherein said rendering of said element is determined by:
breaking said element into a set of segments;
shifting each said segment in said set of segments by a first amount in a direction that is normal to said segment and by a second amount in a direction that is parallel to said segment; and
joining said segments in said set of segments with a NURB.

11. The method of claim 1 further comprising:
assigning a label that corresponds to an element in said scaled set of elements to a label position that is proximal to said corresponding element; and
determining a refined label position by refining said label position against a target function; wherein
said outputting step further comprises placing said label at said refined label position.

12. The method of claim 11, wherein said refining in said determining step comprises a refinement of a set of labels, each label corresponding to a different element in said scaled set of elements; said refinement comprising:
(a) setting an initial temperature t;
(b) randomly selecting a label from said set of labels and defining a bounding box for said label, said bounding box including a center of the element corresponding to said label;
(c) positioning said label at a first position in said bounding box;
(d) determining a first score ($S_1$) using said target function; wherein said target function is determined by said first position of said label;
(e) adjusting the position of said label by an amount to yield a second position;
(f) calculating a second score ($S_2$) using said target function; wherein said target function is determined by said second position of said label;
(g) accepting the new position for said label as defined in step (e):
 (1) when said second score is less than said first score; and
 (2) with the probability $P(\Delta S)$, when said second score is greater than said first score; where $P(\Delta E)$ is a probability function that is dependent upon temperature t,
(h) repeating steps (b) thru (g) for a first predetermined number of times;
(i) decreasing t by an amount; and
(j) executing steps (b) thru (i) until a first occurrence of an exit condition.

13. The method of claim 12 where:

$$P(\Delta S)=\exp^{-[(\Delta S)/(k*t)]}$$

$\Delta S=(S_1)-(S_2)$, and k is a constant.

14. The method of claim 12, wherein said amount that said label is adjusted by in said adjusting step causes said label to extend beyond said bounding box.

15. The method of claim 12, wherein said target function is determined by at least one of:
 a first weight multiplied by a number of elements said label overlaps;
 a second weight multiplied by a number of labels in said set of labels said label overlaps;
 a third weight multiplied by a number of annotations said label overlaps;
 a fourth weight multiplied by a first heavy function; said first heavy function having a value of:
  "1" when said label exceeds a dimension of a viewport, and a value of
  "0" when said label does not exceed a dimension of said viewport;
 a fifth weight multiplied by a normalized distance said label is from a center of said corresponding element; and
 a sixth weight multiplied by a second heavy function; said second heavy function having a value of:
  "1" when said label is below said corresponding element, and a value of
  "0" when said label is above said corresponding element.

16. The method of claim 15, wherein said annotation is a geographic marker.

17. The method of claim 16, wherein the outputting step of claim 1 further comprises drawing an arrow from said label to the corresponding element when the refined label position of said label is outside said bounding box.

18. The method of claim 1, wherein said outputting step of claim 1 further comprises the step of extending a length of an element in said scaled set elements when the label corresponding to said element extends past said element.

19. A computer program product for use in conjunction with a computer system to prepare a route map that describes a path between a start and an end, the computer program product comprising a computer readable storage medium and a computer program mechanism embedded therein, the computer program mechanism comprising:
 a direction parser module that includes instructions for obtaining said path from said start to said end, said path comprising an initial set of elements, each said element including sufficient information to determine a direction and each said element intersecting at least one other element in said initial set of elements; a first element in said initial set of elements including said start and a second element in said initial set of elements including said end;
 a road layout module that includes instructions for applying a different scale factor to each of at least two elements in said initial set of elements; wherein application of said different scale factor to each of said at least two elements produces a scaled set of elements; and
 a map renderer module that includes instructions for outputting a rendering of each element in said scaled set of elements.

20. The computer program product of claim 19, wherein said road layout module further includes instructions for requiring that a value of each said different scale factor is subject to the constraint that the relative ranking, based on length, of each element in said scaled set of elements is the same as the relative length of the corresponding element in said initial set of elements.

21. The computer program product of claim 19, wherein said road layout module further comprises:
 instructions for associating each element in said initial set of elements with a bin, selected from a set of bins, based on a length of said element; each bin in said set of bins representing a range of element lengths that does not overlap with a range of element lengths represented by another bin in said set of bins; and
 instructions for providing each bin with a different bin scale factor;
 wherein each said different scale factor applied to each element in said initial set of elements is the bin scale factor that corresponds to the bin to which said element is associated.

22. The computer program product of claim 19, wherein said route map includes a bounding edge and said road layout module further comprises instructions for deriving each said different scale factor, said instructions including:
 (i) instructions for applying a single scale factor to each element in said initial set of elements to form said scaled set of elements; said single scale factor determined by a factor necessary to adjust a length of a shortest element in said initial set of elements so that said element has a length that exceeds a minimum length threshold;
 (ii) instructions for traversing said path until a first element in said scaled set of elements exceeds said bounding edge; wherein, when an element exceeds said bounding edge, said road layout module further comprises:
  (a) instructions for noting each element having a length that is longer than said minimum length threshold and a direction that is within ninety degrees of the direction of said first element that has been traversed by said instructions for traversing; wherein said instructions further include instructions for indexing said noted elements by a length, with a longest element first;
  (b) instructions for sequentially selecting an element from said index, and for each selected element said road layout module further includes:
   (1) instructions for adjusting a different scale factor associated with said selected element to minimize the length of the element, with the proviso that the relative length of said selected element after application of the different scale factor is the same as the corresponding element in said initial set of elements; and
   (2) instructions for determining whether said first element continues to exceed said bounding edge; wherein, when said first element no longer exceeds said bounding edge, the instructions of (ii)(b) are terminated; and
 (iii) instructions for repeating the instructions of (ii) until no element in said scaled set of elements exceeds said bounding edge.

23. The computer program product of claim 19, wherein said computer program mechanism further comprises an objective function module for determining a quality of a route map, and said road layout module further includes:
 (a) instructions for applying a scale factor to each element in said initial set of elements to form said scaled set of elements; said single scale factor determined by a factor necessary to adjust a length of a shortest element in said initial set of elements so that said shortest element has a length that exceeds a minimum length threshold;

(b) instructions for setting an initial temperature t;

(c) instructions for determining a first score ($E_1$) using said objective function module;

(d) instructions providing an arbitrary scale factor for a randomly selected element in said scaled set of elements;

(e) instructions calculating a second score ($E_2$) using said objective function module;

(f) instructions for assigning said arbitrary scale factor to said randomly selected element:
 (1) when $E_2$ is less than $E_1$; and
 (2) with the probability $P(\Delta E)$, when $E_2$ is greater than $E_1$; where $P(\Delta E)$ is a probability function that is dependent upon temperature t, (g) instructions for repeating the instructions of (c) thru (f) for a first predetermined number of times;

(h) instructions for decreasing t by an amount; and (i) instructions for executing the instructions of (c) thru (h) until a first occurrence of an exit condition.

24. The method of claim 23 where:

$$P(\Delta E) = \exp^{-[(\Delta E)/(k*t)]}$$

$\Delta E = (E_1) - (E_2)$, and k is a constant.

25. The computer program product of claim 23, wherein said exit condition occurs when the instructions of (i) have been executed a second predetermined number of times.

26. The computer program product of claim 23, wherein the objective function module comprises instructions for initializing a score; and the objective function module further includes:

(i) instructions for adding, to said score, a first value determined by a first weight multiplied by a number of false intersections existing between elements in said scaled set of elements;

(ii) instructions for adding, to said score, a second value determined by a second weight multiplied by a number of elements in said scaled set of elements that do not have the same relative length as the corresponding element in said initial set of elements;

(iii) instructions for adding, to said score, a third value determined by a third weight multiplied by a number of elements in said scaled set of elements having a length that is shorter than a minimum length threshold; and (iv) instructions for adding, to said score, a fourth value determined by a fourth weight multiplied by a number of elements in said scaled set of elements having a vector that varies by more than a predetermined number of degrees from a vector of a corresponding element in said initial set of elements.

27. The computer program product of claim 19, wherein said direction parser module further includes:

instructions for obtaining a geographic marker;

instructions for positioning said geographic marker deterministically at a first position relative to said scaled set of elements; and said map renderer module further includes instructions for outputting said geographic marker at said first position.

28. The computer program product of claim 19, wherein said instructions for rendering each said element includes:

instructions for breaking said element into a set of segments;

instructions for shifting each said segment in said set of segments by a first amount in a direction that is normal to said segment and by a second amount in a direction that is parallel to said segment; and instructions for joining said segments in said set of segments with a NURB.

29. The computer program product of claim 19, further including:

a label layout module that includes instructions for assigning a label, which corresponds to an element in said scaled set of elements, to a label position that is proximal to said corresponding element; the label layout module further including instructions for determining a refined label position by refining said label position against a target function; and said map renderer module further includes instructions for outputting said label at said refined label position.

30. The computer program product of claim 29, wherein:

said computer program mechanism further comprises a target function module for evaluating a quality of a label position, and said label layout module further includes instructions for refining a set of labels; each label corresponding to a different element in said scaled set of elements, said instructions for refining said set of labels including:

(a) instructions for setting an initial temperature t;

(b) instructions for randomly selecting a label from said set of labels and defining a bounding box for said label, said bounding box including a center of the element corresponding to said selected label;

(c) instructions for positioning said selected label at a first position in said bounding box;

(d) instructions for determining a first score ($S_1$) using said target function module; wherein a value of said target function module is determined by said first position;

(e) instructions for adjusting the position of said label by an amount to yield a second position;

(f) instructions for calculating a second score ($S_2$) using said target function module;

(g) instructions for accepting said second position for said label:
 (1) when $S_2$ is less than $S_1$; and
 (2) with the probability $P(\Delta S)$, when said second score is greater than said first score; where $P(\Delta E)$ is a probability function that is dependent upon temperature t;

(h) instructions for repeating the instructions of (b) thru (g) for a first predetermined number of times;

(i) instructions for decreasing t by an amount; and (j) instructions for executing the instructions of (b) thru (i) until a first occurrence of an exit condition.

31. The computer program product of claim 30 wherein:

$$P(\Delta S) = \exp^{-[(\Delta S)/(k*t)]}$$

$\Delta S = (S_1) - (S_2)$, and k is a constant.

32. The computer program product of claim 29, wherein when said label is positioned at said second position, said label extends beyond said bounding box.

33. The computer program product of claim 29, wherein said target function module includes instructions for initializing a score, said target function module further including at least one of:

instructions for adding, to said score, a first value determined a first weight multiplied by a number of elements said label overlaps;

instructions for adding, to said score, a second value determined a second weight multiplied by a number of labels in said set of labels said label overlaps;

instructions for adding, to said score, a third value determined a third weight multiplied by a number of annotations said label overlaps;

instructions for adding, to said score, a fourth value determined a fourth weight multiplied by a first heavy function; said first heavy function having a value of:

"1" when said label exceeds a dimension of a viewport, and a value of

"0" when said label does not exceed a dimension of said viewport;

instructions for adding, to said score, a fifth value determined a fifth weight multiplied by a normalized distance said label is from a center of said corresponding element; and instructions for adding, to said score, a sixth value determined a sixth weight multiplied by a second heavy function; said second heavy function having a value of:

"1" when said label is below said corresponding element, and a value of

"0" when said label is above said corresponding element.

34. The computer program product of claim 33, wherein said annotation is a geographic marker.

35. The computer program product of claim 34, wherein said map renderer module of claim 16 further comprises instructions for drawing an arrow from said label to the corresponding element when the refined label position of said label is outside said bounding box.

36. The computer program product of claim 19, wherein said map renderer module further comprises instructions for extending the length of an element in said scaled set elements when the label corresponding to said element extends past said element.

37. A computer system for preparing a route map that describes a path between a start and an end, the computer system comprising:

a central processing unit;

a memory, coupled to the central processing unit, the memory storing:

a direction parser module that includes instructions for obtaining said path from said start to said end, said path comprising an initial set of elements, each said element including sufficient information to determine a direction and each said element intersecting at least one other element in said initial set of elements; a first element in said initial set of elements including said start and a second element in said initial set of elements including said end;

a road layout module that includes instructions for independently applying a different scale factor to each of at least two elements in said initial set of elements; wherein application of said different scale factor to each of said at least two elements produces a scaled set of elements;

a label layout module that includes instructions for assigning a label that corresponds to an element in said scaled set of elements to a label position that is proximal to said corresponding element; the label layout module further including instructions for determining a refined label position by refining said label position against a target function; and a map renderer module that includes instructions outputting a rendering of each element in said scaled set of elements.

38. The computer system of claim 37, the memory further storing:

a label layout module that includes instructions for assigning a label that corresponds to an element in said scaled set of elements to a label position that is proximal to said corresponding element; the label layout module further including instructions for determining a refined label position by refining said label position against a target function; and said map renderer module further includes instructions for outputting said label at said refined label position.

* * * * *